US012754742B2

(12) United States Patent
Farley et al.

(10) Patent No.: US 12,754,742 B2
(45) Date of Patent: Oct. 6, 2026

(54) BIOS-INITIALIZATION-BASED CAPABILITIES CONFIGURATION SYSTEM

(71) Applicant: Dell Products L.P., Round Rock, TX (US)

(72) Inventors: Douglas Lang Farley, Round Rock, TX (US); Srinivas Giri Raju Gowda, Fremont, CA (US); Trevor Christian Cockrell, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 98 days.

(21) Appl. No.: 18/985,437

(22) Filed: Dec. 18, 2024

(65) Prior Publication Data

US 2026/0169756 A1 Jun. 18, 2026

(51) Int. Cl.
*G06F 9/44* (2018.01)
*G06F 9/4401* (2018.01)

(52) U.S. Cl.
CPC .......... *G06F 9/4406* (2013.01); *G06F 9/4411* (2013.01)

(58) Field of Classification Search
CPC ..................................... G06F 1/32; G06F 9/44
See application file for complete search history.

(56) References Cited

U.S. PATENT DOCUMENTS

| | | | | |
|---|---|---|---|---|
| 9,507,581 | B2 | 11/2016 | Butcher et al. | |
| 12,468,784 | B2 * | 11/2025 | Deshpande | G06F 21/602 |
| 2022/0091858 | A1 * | 3/2022 | Chivukula | H04L 63/0272 |
| 2023/0266983 | A1 * | 8/2023 | Fong | G06F 9/45558 703/24 |

* cited by examiner

*Primary Examiner* — Keshab R Pandey
(74) *Attorney, Agent, or Firm* — Joseph Mencher

(57) ABSTRACT

A BIOS-initialization-based capabilities configuration system includes a computing device having a BIOS coupled to a plurality of capabilities subsystems. The BIOS begins initialization operations for the computing device, identifies a plurality of computing device capabilities software, and discovers capabilities of the plurality of capabilities subsystems. Based on the capabilities discovered for the plurality of computing device capabilities subsystems, the BIOS retrieves a subset of the plurality of computing device capabilities software, provides the subset of the plurality of computing device capabilities software on the computing device, and validates the subset of the plurality of computing device capabilities software provided on the computing device. Subsequent to validating the subset of the plurality of computing device capabilities software provided on the computing device, the BIOS provides an operating system on the computing device to complete the initialization operations for the computing device and enter a runtime environment for the computing device.

20 Claims, 17 Drawing Sheets

BIOS-INITIALIZATION-BASED CAPABILITIES CONFIGURATION SYSTEM

BACKGROUND

The present disclosure relates generally to information handling systems, and more particularly to configuring the capabilities of information handling systems during their initialization using a Basic Input/Output System (BIOS).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In information handling systems such as, for example, server devices and/or other computing devices known in the art, a variety of capabilities may be available that must be configured in order to be used. Conventionally, a Basic Input/Output System (BIOS) in the computing device is used to provide an operating system on the computing device as part of the initialization of that computing device, and then the operating system is used to configure the capabilities available in that computing device during runtime of that computing device. For example, the BIOS may use BIOS code stored on a BIOS storage device (e.g., a Serial Peripheral Interface (SPI) flash storage device) to provide the operating system on the computing device as part of the initialization of that computing device, and then the operating system on the computing device may be used to retrieve and install computing device capability software on the computing device to enable its available capabilities during runtime of that computing device.

The configuration of the available capabilities of the computing device during runtime using the operating system is relatively insecure, as the computing device provider of the computing device has relatively less control over the operating system/runtime environment as compared to the BIOS/initialization environment discussed above. However, conventional computing devices rely on such operating-system-runtime-based capabilities configuration because the BIOS storage device used by the BIOS is relatively small and does not have sufficient storage space to store the computing device capability software required to enable the capabilities of the computing device. As such, in situations where more complex operating system capabilities such as an operating system agent are desired for the computing device, as well as when networking capabilities security capabilities, accelerator capabilities, graphics processing capabilities, and/or other capabilities are desired in addition to those provided by the operating system that is conventionally provided by the BIOS as described above, the relatively insecure operating-system-runtime-based capabilities configurations discussed above must be performed. Furthermore, as discussed below, there are other situations where the configuration of the available capabilities of computing devices would be beneficial prior to the provisioning of the operating system and entering the runtime environment, and conventional capabilities configuration techniques simply provide no option to do so.

Accordingly, it would be desirable to provide a computing device capabilities configuration system that addresses the issues discussed above.

SUMMARY

According to one embodiment, an Information Handling System (IHS) includes a Basic Input/Output System (BIOS) processing system; and a BIOS memory system that is coupled to the BIOS processing system and that includes instructions that, when executed by the BIOS processing system, cause the BIOS processing system to provide a BIOS engine that is configured to: begin initialization operations for the IHS; identify a plurality of capabilities software; discover first capabilities of a plurality of capabilities subsystems that are coupled to the BIOS processing system; retrieve, based on the first capabilities discovered for the plurality of capabilities subsystems, a first subset of the plurality of capabilities software; provide the first subset of the plurality of capabilities software on the IHS; validate the first subset of the plurality of capabilities software provided on the IHS; and provide, subsequent to validating the first subset of the plurality of computing device capabilities software provided on the IHS, an operating system on the IHS to complete the initialization operations for the IHS and enter a runtime environment for the IHS.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
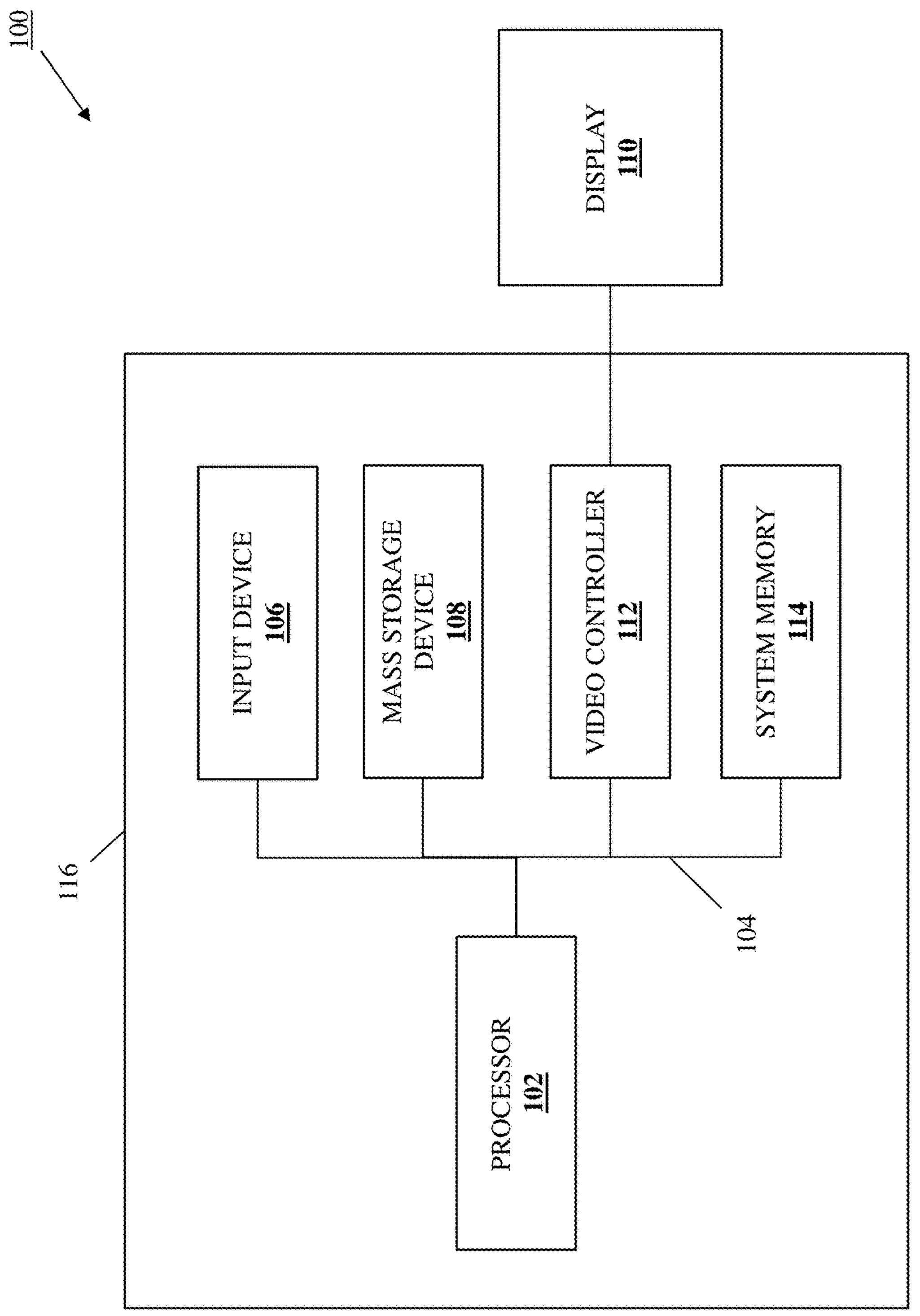
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the BIOS-initialization-based capabilities configuration systems and methods of the present disclosure may be utilized with Logically Composed Systems (LCSs), which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
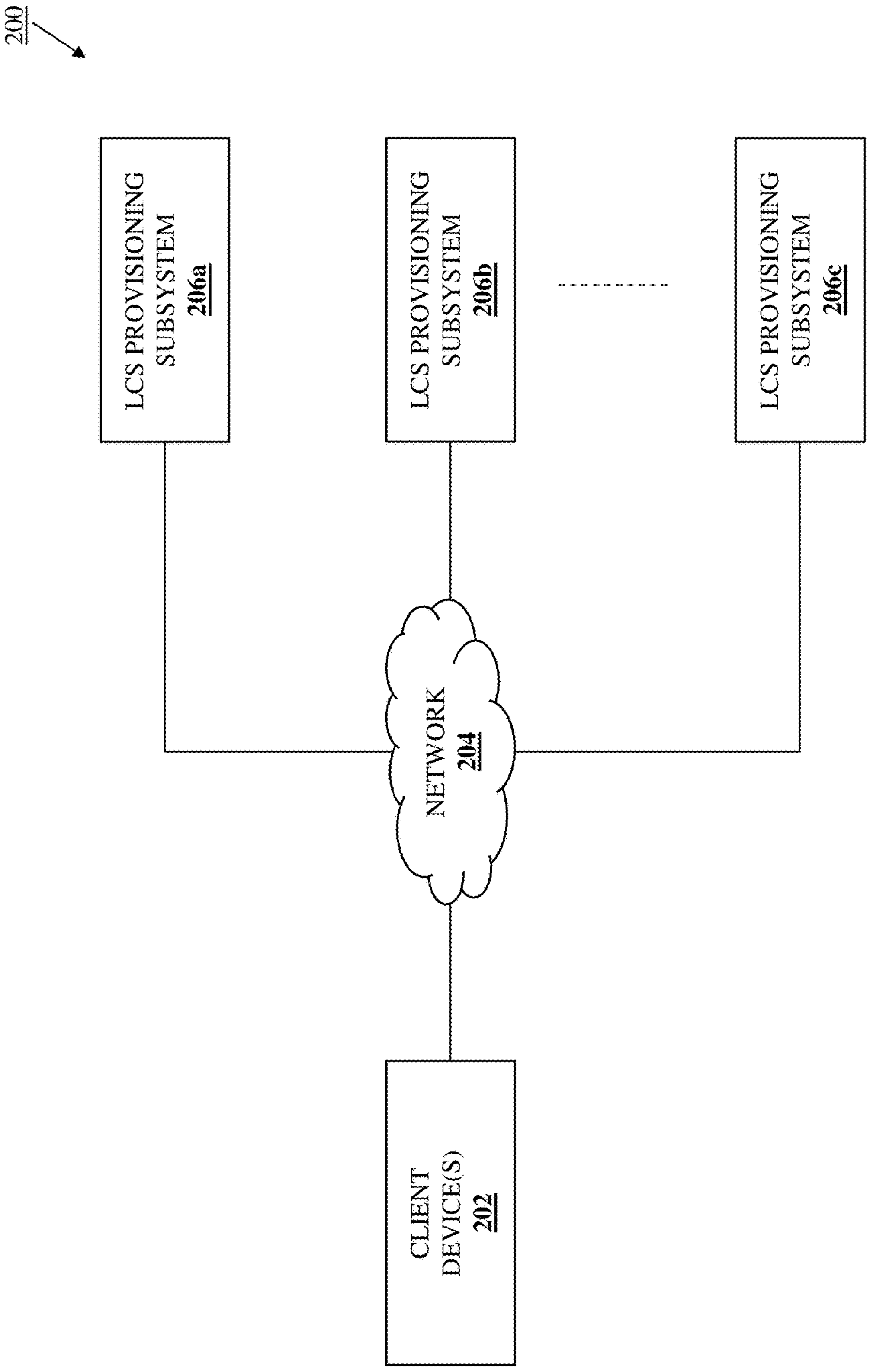
FIG. 2 is a schematic view illustrating an embodiment of an LCS provisioning system.

With reference to FIG. 2, an embodiment of a Logically Composed System (LCS) provisioning system 200 is illustrated that may utilize the BIOS-initialization-based capabilities configuration systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206*a*, 206*b*, and up to 206*c* are coupled to the network 204 such that any or all of those LCS provisioning subsystems 206*a*-206*c* may provide LCSs to the client device(s) 202 as discussed in further detail below. In an embodiment, any or all of the LCS provisioning subsystems 206*a*-206*c* may include one or more of the IHS 100 discussed above with reference to FIG. 1 and/or may include some or all of the components of the IHS 100. For example, in some of the specific examples provided below, each of the LCS provisioning subsystems 206*a*-206*c* may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206*a*-206*c*) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
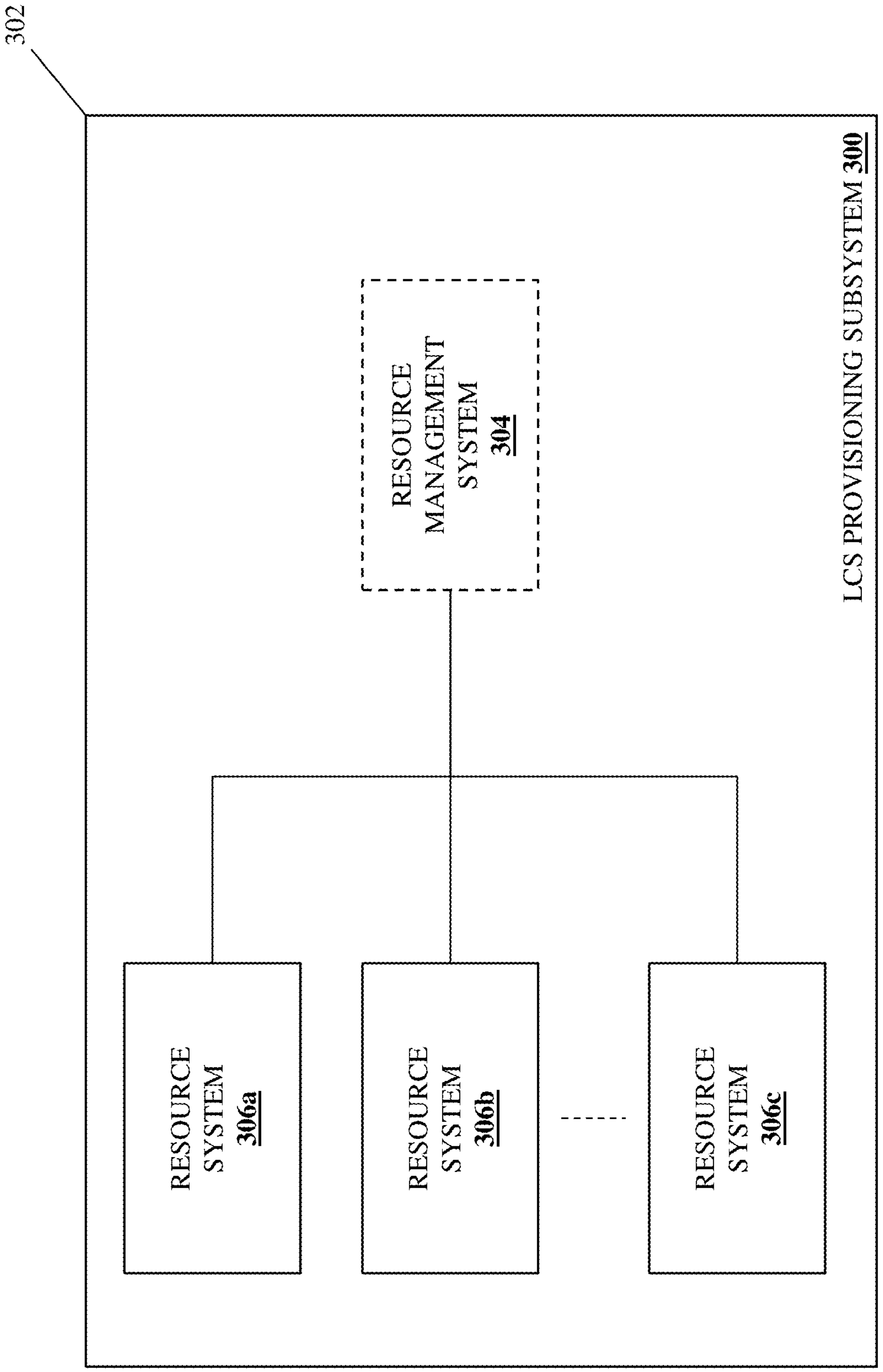
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206*a*-206*c* discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306*a*, 306*b*, and up to 306*c*. In an embodiment, any of the resource management system 304 and the resource systems 306*a*-306*c* may be provided by the IHS 100 discussed above with reference to FIG. 1 and/or may include some or all of the components of the IHS 100. In the specific embodiments provided below, each of the resource management system 304 and the resource systems 306*a*-306*c* may include a System Control Processor (SCP) device that may be conceptualized as an "enhanced" SmartNIC device that may be configured to perform functionality that is not available in conventional SmartNIC devices such as, for example, the resource management functionality, LCS provisioning functionality, and/or other SCP functionality described herein.

In an embodiment, any of the resource systems 306*a*-306*c* may include any of the resources described below coupled to an SCP device that is configured to facilitate management of those resources by the resource management system 304. Furthermore, the SCP device included in the resource management system 304 may provide an SCP Manager (SCPM) subsystem that is configured to manage the SCP devices in the resource systems 306*a*-306*c*, and that performs the functionality of the resource management system 304 described below. In some examples, the resource management system 304 may be provided by a "stand-alone" system (e.g., that is provided in a separate chassis from each of the resource systems 306*a*-306*c*), and the SCPM subsystem discussed below may be provided by a dedicated SCP device, processing/memory resources, and/or other components in that resource management system 304. However, in other embodiments, the resource management system 304 may be provided by one of the resource systems 306*a*-306*c* (e.g., it may be provided in a chassis of one of the resource systems 306*a*-306*c*), and the SCPM subsystem may be provided by an SCP device, processing/memory resources, and/or any other components om that resource system.

As such, the resource management system 304 is illustrated with dashed lines in FIG. 3 to indicate that it may be a stand-alone system in some embodiments, or may be provided by one of the resource systems 306*a*-306*c* in other embodiments. Furthermore, one of skill in the art in possession of the present disclosure will appreciate how SCP devices in the resource systems 306*a*-306*c* may operate to "elect" or otherwise select one or more of those SCP devices to operate as the SCPM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
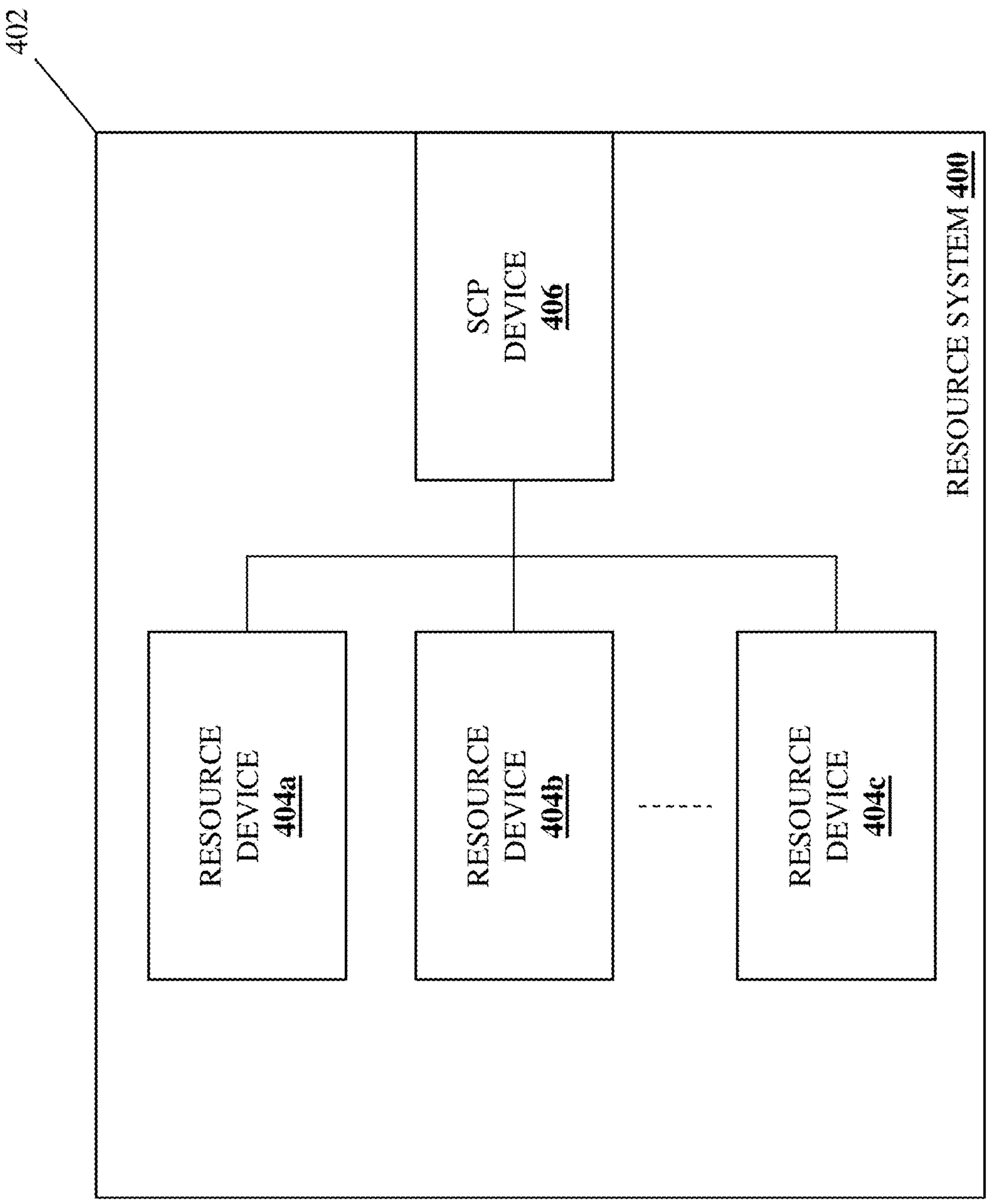
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306*a*-306*c* discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406. In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404*a*, 404*b*, and up to 404*c*, each of which is coupled to the SCP device 406. For example, the resource devices 404*a*-404*c* may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404*a*-404*c* discussed below. As such, the resource devices 404*a*-404*c* in the resource systems 306*a*-306*c*/400 may be considered a "pool" of resources that are available to the resource management system 304 for use in composing LCSs.

To provide a specific example, the SCP devices described herein may operate to provide a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. Further, as discussed below, the SCP devices describe herein may include Software-Defined Storage (SDS) subsystems, inference subsystems, data protection subsystems, Software-Defined Networking (SDN) subsystems, trust subsystems, data management sub-systems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciated that functionality described herein may be enabled on other devices while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404*a*-404*c*. For example, the chassis 402 of the resource system 400 may house a plurality of processing systems (i.e., the resource devices 404*a*-404*c*) coupled to the SCP device 406. In another example, the chassis 402 of the resource system 400 may house a plurality of memory systems (i.e., the resource devices 404*a*-404*c*) coupled to the SCP device 406. In another example, the chassis 402 of the resource system 400 may house a plurality of storage devices (i.e., the resource devices 404*a*-404*c*) coupled to the SCP device 406. In another example, the chassis 402 of the resource system 400 may house a plurality of networking devices (i.e., the resource devices 404*a*-404*c*) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404*a*-404*c* for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404*a*-404*c* while remaining within the scope of the present disclosure as well.

Figure 5:
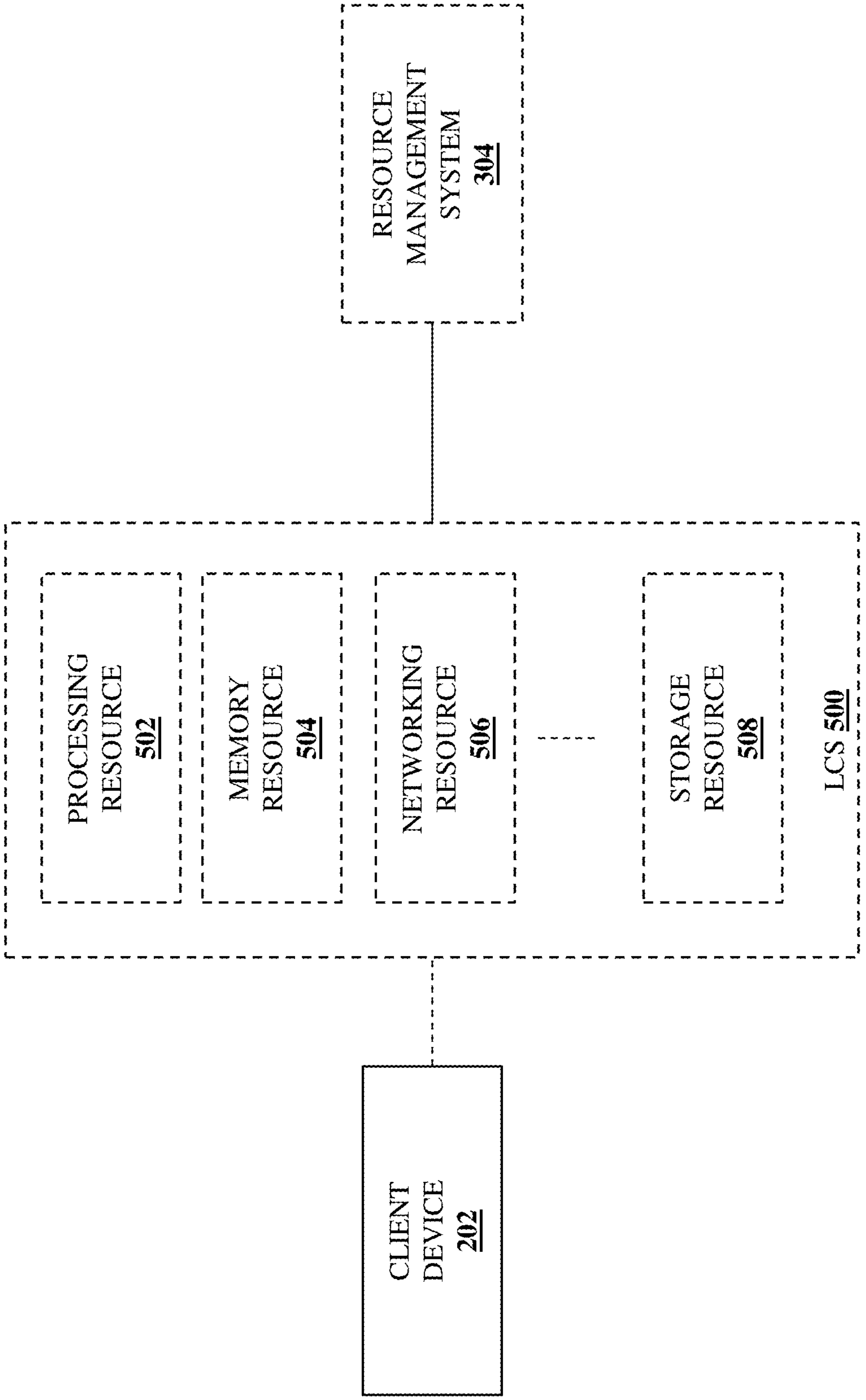
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206*a*-206*c*, and may be satisfied using resource systems that are included within that LCS provisioning subsystem, or satisfied using resource systems that are included across the different LCS provisioning subsystems 206*a*-206*c*.

As such, the resource management system 304 in the LCS provisioning subsystem that received the workload intent may operate to compose the LCS 500 using resource devices 404*a*-404*c* in the resource systems 306*a*-306*c*/400 in that LCS provisioning subsystem, and/or resource devices 404*a*-404*c* in the resource systems 306*a*-306*c*/400 in any of the other LCS provisioning subsystems. FIG. 5 illustrates the LCS 500 including a processing resource 502 allocated from one or more processing systems provided by one or more of the resource devices 404*a*-404*c* in one or more of the resource systems 306*a*-306*c*/400 in one or more of the LCS provisioning subsystems 206*a*-206*c*, a memory resource 504 allocated from one or more memory systems provided by one or more of the resource devices 404*a*-404*c* in one or more of the resource systems 306*a*-306*c*/400 in one or more of the LCS provisioning subsystems 206*a*-206*c*, a networking resource 506 allocated from one or more networking devices provided by one or more of the resource devices 404*a*-404*c* in one or more of the resource systems 306*a*-306*c*/400 in one or more of the LCS provisioning subsystems 206*a*-206*c*, and/or a storage resource 508 allocated from one or more storage devices provided by one or more of the resource devices 404*a*-404*c* in one or more of the resource systems 306*a*-306*c*/400 in one or more of the LCS provisioning subsystems 206*a*-206*c*.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306*a*-306*c*/400 that allocate any of the resource devices 404*a*-404*c* that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device (s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
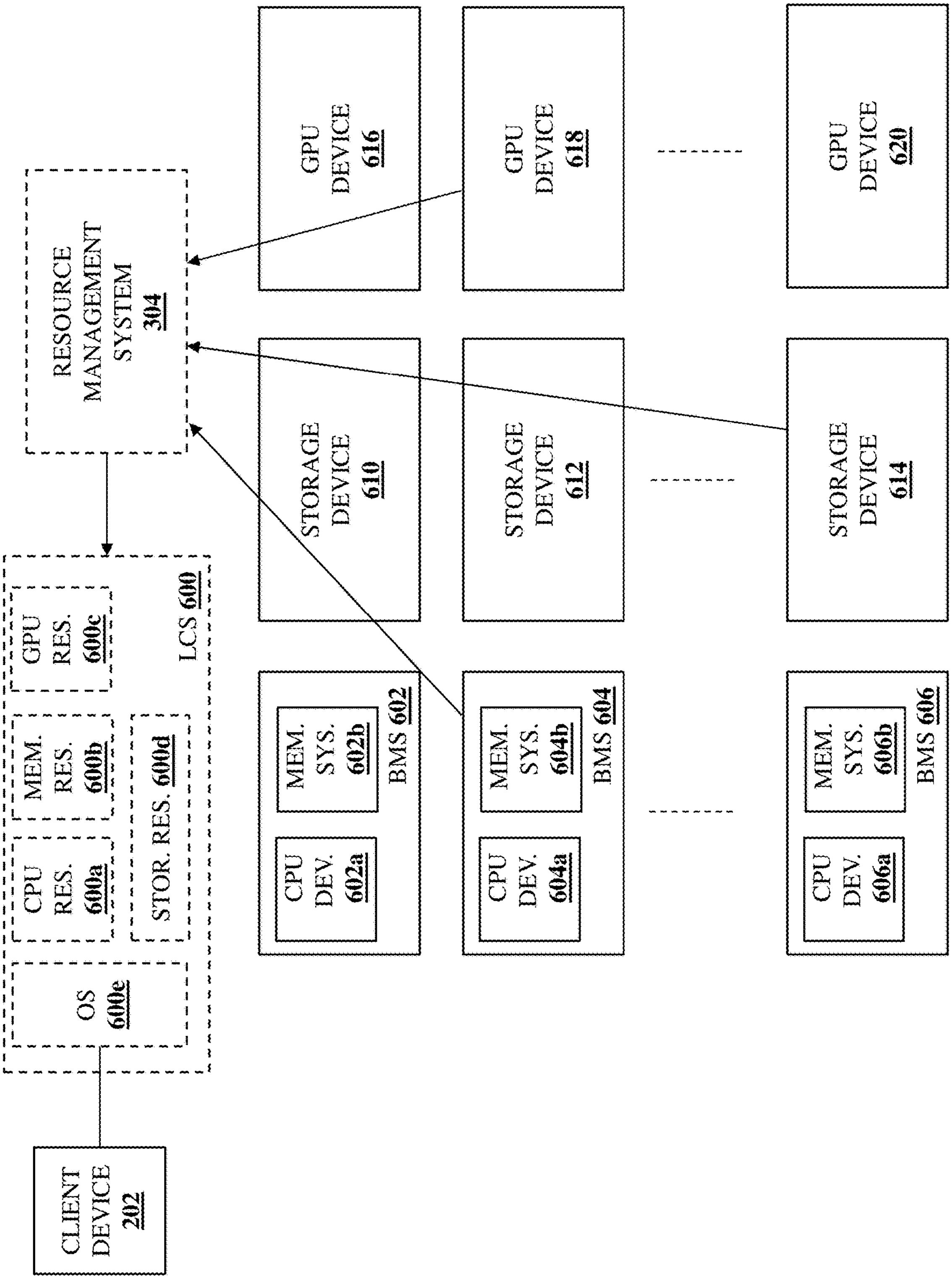
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306*a*-306*c* available to the resource management system 304 include a Bare Metal Server (BMS) 602 having a Central Processing Unit (CPU) device 602*a* and a memory system 602*b*, a BMS 604 having a CPU device 604*a* and a memory system 604*b*, and up to a BMS 606 having a CPU device 606*a* and a memory system 606*b*. Furthermore, one or more of the resource systems 306*a*-306*c* includes resource devices 404*a*-404*c* provided by a storage device 610, a storage device 612, and up to a storage device 614. Further still, one or more of the resource systems 306*a*-306*c* includes resource devices 404*a*-404*c* provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600*a* that utilize the CPU device 604*a* in the BMS 604, and memory resources 600*b* that utilize the memory system 604*b* in the BMS 604. Furthermore, the resource management system 304 may compose the LCS 600 using the storage device 614 to provide the LCS 600 with storage resources 600*d*, and using the GPU device 318 to provide the LCS 600 with GPU resources 600*c*. As illustrated in the specific example in FIG. 6, the CPU device 604*a* and the memory system 604*b* in the BMS 604 may be configured to provide an operating system 600*e* that is presented to the client device 202 as being provided by the CPU resources 600*a* and the memory resources 600*b* in the LCS 600, with operating system 600*e* utilizing the GPU device 618 to provide the GPU resources 600*c* in the LCS 600, and utilizing the storage device 614 to provide the storage resources 600*d* in the LCS 600. The user of the client device 202 may then provide any application(s) on the operating system 600*e* provided by the CPU resources 600*a*/CPU device 604*a* and the memory resources 600*b*/memory system 604*b* in the LCS 600/BMS 604, with the application(s) operating using the CPU resources 600*a*/CPU device 604*a*, the memory resources 600*b*/memory system 604*b*, the GPU resources 600*c*/GPU device 618, and the storage resources 600*d*/storage device 614.

Furthermore, as discussed above, the SCP device(s) 406 in the resource systems 306*a*-306*c*/400 that allocates any of the CPU device 604*a* and memory system 604*b* in the BMS 604 that provide the CPU resource 600*a* and memory resource 600*b*, the GPU device 618 that provides the GPU resource 600*c*, and the storage device 614 that provides storage resource 600*d*, may also allocate SCP hardware and/or perform enhanced functionality (e.g., the enhanced storage functionality in the specific examples provided above) for any of those resources that may otherwise not be available in the CPU device 604*a*, memory system 604*b*, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600*c* may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600*a*, the memory resources 600*b*, the GPU resources 600*c*, and the storage resources 600*d*, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being underutilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
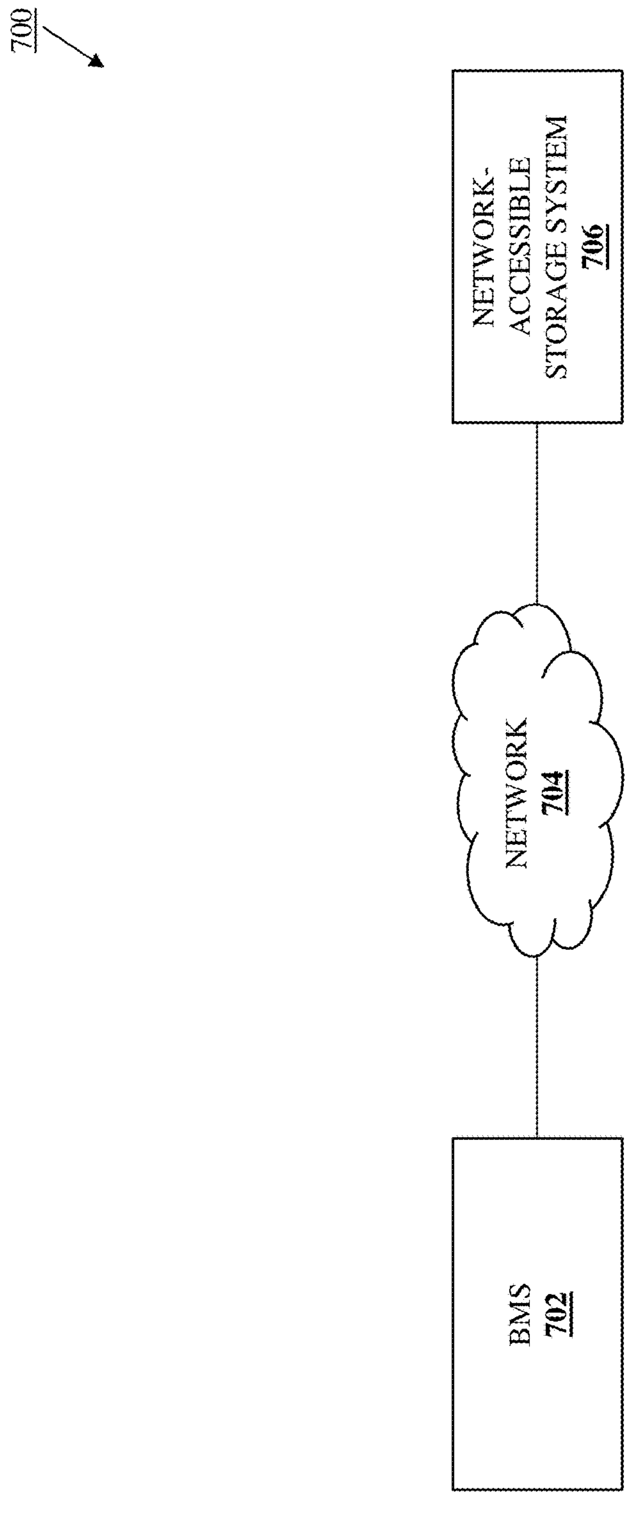
FIG. 7 is a schematic view illustrating an embodiment of a networked system that may include the BIOS-initialization-based capabilities configuration system of the present disclosure.

Referring now to FIG. 7, an embodiment of a networked system 700 is illustrated that may include the BIOS-initialization-based capabilities configuration system of the present disclosure. In the illustrated embodiment, the networked system 200 includes a computing device that, in the examples below, is provided by a BMS 702 that may provide any of the BMSs 602-606 discussed above with reference to FIG. 6, and that may be provided by the resource system 400 discussed above with reference to FIG. 4. However, while illustrated and discussed as being provided by a BMS 702, one of skill in the art in possession of the present disclosure will recognize that computing devices provided in the networked system 200 may include any devices that may be configured to operate similarly as the BMS 702 discussed below. As illustrated, the BMS 702 may be coupled to a network 704 that may be provided by a Local Area Network (LAN), the Internet, combinations thereof, and/or any other networks that would be apparent to one of skill in the art in possession of the present disclosure.

Furthermore, a network accessible storage system 706 may be coupled to the network 704 as well, and may include storage devices connected to the network 704 (e.g., storage devices provided by the resource devices 404*a*-404*c* in the resource systems 306*a*-306*c*/400 of the LCS provisioning systems 206*a*-206*c*/300 that are connected to the network 204 as described above) using any techniques that would be apparent to one of skill in the art in possession of the present disclosure. However, while a specific networked system 200 has been illustrated and described, one of skill in the art in possession of the present disclosure will recognize that the BIOS-initialization-based capabilities configuration system of the present disclosure may include a variety of components and component configurations while remaining within the scope of the present disclosure as well.

Figure 8:
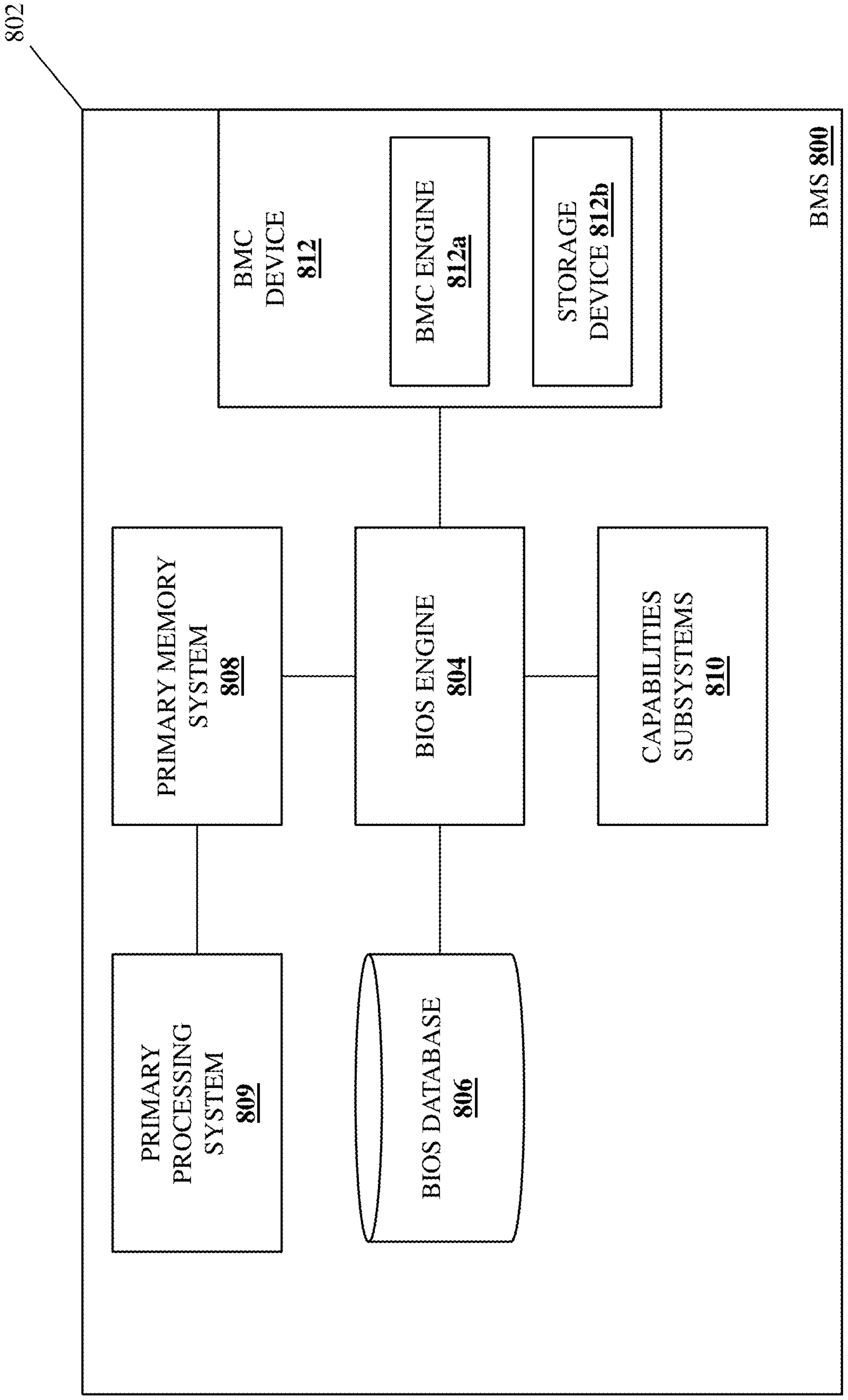
FIG. 8 is a schematic view illustrating an embodiment of a BMS that may be provided in the networked system of FIG. 7.

Referring now to FIG. 8, an embodiment of a BMS 800 is illustrated that may provide the BMS 702 discussed above with reference to FIG. 7. As such, while illustrated and discussed as being provided by a BMS, one of skill in the art in possession of the present disclosure will recognize that the functionality of the BMS 800 discussed below may be provided by other computing devices that are configured to operate similarly as the BMS 800 discussed below. In the illustrated embodiment, the BMS 800 includes a chassis 802 that houses the components of the BMS 800, only some of which are illustrated and described below. For example, the chassis 802 may house a BIOS processing system (not illustrated, but which may include any of a variety of BIOS processing firmware known in the art) and a BIOS memory system (not illustrated, but which may include any of a variety of BIOS memory firmware known in the art) that is coupled to the BIOS processing system and that includes instructions that, when executed by the BIOS processing system, cause the BIOS processing system to provide a BIOS engine 804 that is configured to perform the functionality of the BIOS engines, BIOS, and/or BMS discussed below. Furthermore, while illustrated and described as a "BIOS", one of skill in the art in possession of the present disclosure will appreciate how the BIOS discussed below may be provide according to Unified Extensible Firmware Interface (UEFI) specifications that defines a firmware architecture that replaces conventional BIOS while remaining within the scope of the present disclosure as well.

The chassis 802 may also house a BIOS storage system (not illustrated, but which may include any of a variety of BIOS storage systems known in the art such as, for example, a Serial Peripheral Interface (SPI) flash storage device) that is coupled to the BIOS engine 804 (e.g., via a coupling between the BIOS storage system and the BIOS processing system) and that includes a BIOS database 806 that is configured to store information utilized by the BIOS engine 804 as discussed below. The chassis 802 may also house a primary memory system 808 (e.g., which may include the memory 114 discussed above with reference to FIG. 1 such as, for example, Dynamic Random Access Memory (DRAM)) that is coupled to the BIOS engine 804 (e.g., via a coupling between the primary memory system 808 and the BIOS processing system). The chassis 802 may also house a primary processing system 809 (e.g., which may include the processor 102 discussed above with reference to FIG. 1 such as, for example, a Central Processing Unit (CPU)) that is coupled to the primary memory system 808 and that, while not illustrated or described in detail, may be coupled to any of the other components of the BMS 800 as well.

The chassis 802 may also house a plurality of capabilities subsystems 810 that may be provided by any hardware included in the BMS 800, any firmware included in the BMS 800, and/or any other capability provisioning components of the BMS 800 that one of skill in the art in possession of the present disclosure would recognize as enabling any of the capabilities of the BMS 800 discussed below. As such, one of skill in the art in possession of the present disclosure will appreciate how the plurality of capabilities subsystems 810 may include the primary processing system 809, the primary memory system 808 (e.g., including hardware-based and software-based memory persistency capabilities (e.g., Software-Defined Persistent Memory (SDPM), Copy-to-Flash technology, etc.), networking components (e.g., the Smart Network Interface Controller (SmartNIC) discussed below), security components (e.g., the Trusted Platform Module (TPM) discussed below including hardware-based and software-based Hardware Security Module (HSM) implementations), accelerators, Graphics Processing Units (GPUs), data movement engines (e.g. Smart Data Acceleration Interface (SDXI) functionality, Direct Memory Access (DMA) functionality, Remote DMA (RDMA) functionality, etc.), and/or any other capabilities subsystems that would be apparent to one of skill in the art in possession of the present disclosure.

The chassis 802 may also house a Baseboard Management Controller (BMC) device 812 that may be provided by a integrated DELL® Remote Access Controller (iDRAC) included in server devices available from DELL® Inc. of Round Rock, Texas, United States; a BMC device provided according to OPENBMC® specifications; and/or any other BMC devices that would be apparent to one of skill in the art in possession of the present disclosure. As such, one of skill in the art in possession of the present disclosure will appreciate how the BMC device 812 may be configured to provide out-of-band management and monitoring of hardware in the BMS 800 using mostly separate resources from the BMS 800 and via a browser-based interface or Command-Line Interface (CLI), as well as any other BMC functionality known in the art, in addition to the BIOS-initialization-based capabilities configuration functionality discussed below.

In the illustrated examples, the BMC device 812 may include a BMC processing system (e.g., similar to the processor 102 discussed above with reference to FIG. 1) and a BMC memory system (e.g., similar to the memory 114 discussed above with reference to FIG. 1) that includes instructions that, when executed by the BMC processing system, cause the BMC processing system to provide a BMC engine 812*a* that is configured to perform the operations of the BMC engines, the BMC devices, and/or the BMSs discussed below. The BMC device 812 also includes a storage device 812*b* that is coupled to the BMC engine 812*a* (e.g., via a coupling between the storage device 812*b* and the BMC processing system) and that is configured to store any information utilized by the BMC engine 812*a* as described below. While not illustrated or described in detail, one of skill in the art in possession of the present disclosure appreciate how the BMC device 812 may be coupled to the network 704 discussed above with reference to FIG. 7 via any of a variety of communication components known in the art. However, while a specific BMS 800 has been illustrated and described, one of skill in the art in possession of the present disclosure will recognize that BMSs (or other computing devices operating according to the teachings of the present disclosure in a manner similar to that described below for the BMS 800) may include a variety of components and/or component configurations for providing conventional BMS functionality, as well as the BIOS-initialization-based capabilities configuration functionality discussed below, while remaining within the scope of the present disclosure as well.

Figure 9:
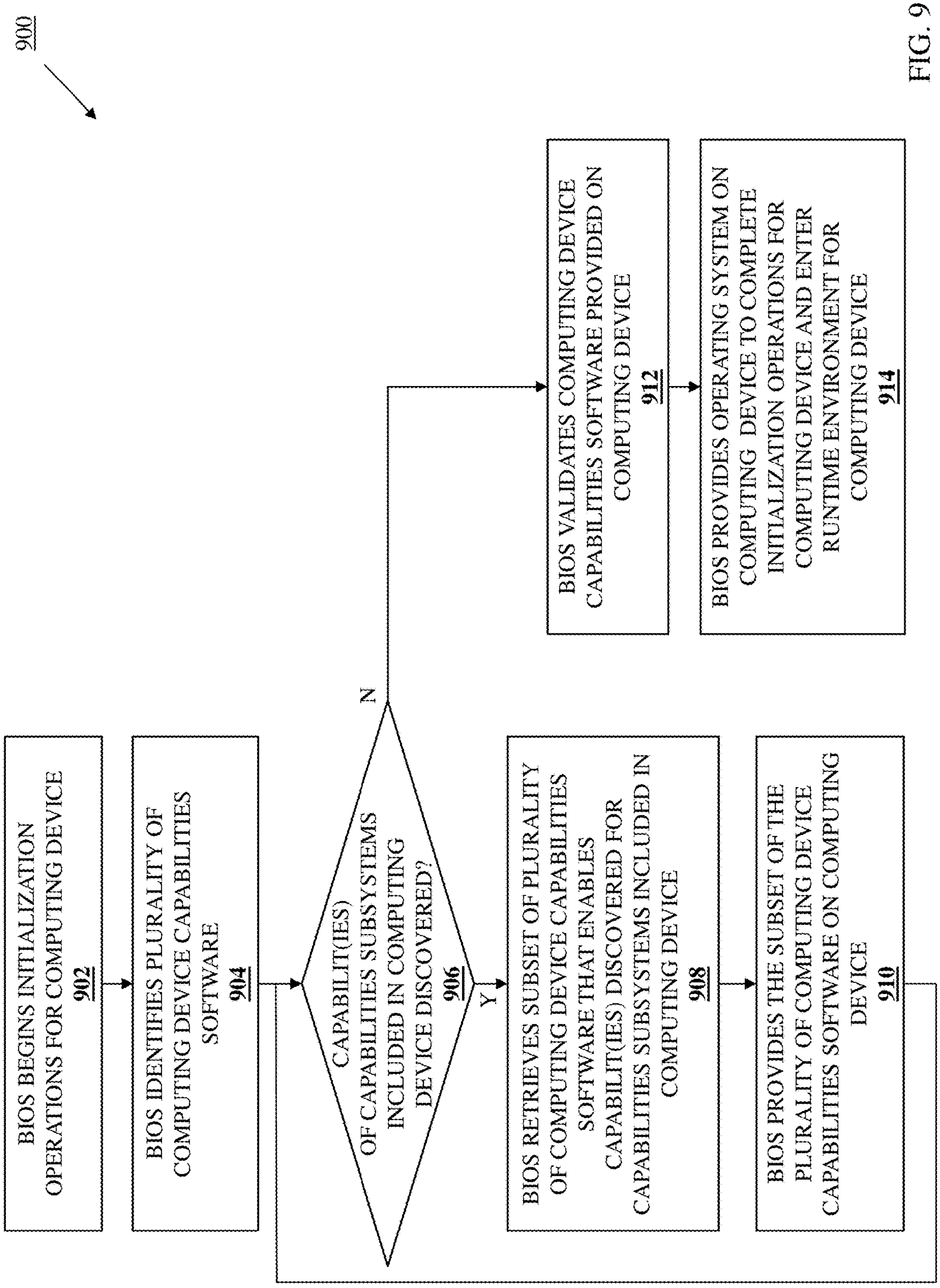
FIG. 9 is a flow chart illustrating an embodiment of a method for configuring capabilities of a computing device by a BIOS during initialization.

Referring now to FIG. 9, an embodiment of a method 900 for configuring capabilities of a computing device by a Basic Input/Output System (BIOS) during initialization is illustrated. As discussed below, the systems and methods of the present disclosure provide for the configuration of the capabilities of a computing device by a BIOS and during initialization of the computing device prior to the provisioning of an operating system on the computing device. For example, the BIOS-initialization-based capabilities configuration system of the present disclosure may include a computing device having a BIOS coupled to a plurality of capabilities subsystems. The BIOS begins initialization operations for the computing device, identifies a plurality of computing device capabilities software, and discovers capabilities of the plurality of capabilities subsystems. Based on the capabilities discovered for the plurality of computing device capabilities subsystems, the BIOS retrieves a subset of the plurality of computing device capabilities software, provides the subset of the plurality of computing device capabilities software on the computing device, and validates the subset of the plurality of computing device capabilities software provided on the computing device. Subsequent to validating the subset of the plurality of computing device capabilities software provided on the computing device, the BIOS provides an operating system on the computing device to complete the initialization operations for the computing device and enter a runtime environment for the computing device. As such, secure capabilities configuration is provided for a computing device during its initialization to enable relatively more complex operating system capabilities, networking capabilities, security capabilities, accelerator capabilities, graphics processing capabilities, and/or other capabilities prior to the provisioning of an operating system on that computing device.

In the examples described below, the method 900 provides for the configuration of the capabilities of the BMS 702/800 so that the BMS 702/800 may later be configured based on the workload intent that may be provided by a user as described above. As such, the configuration of the capabilities of the BMS 702/800 during the method 900 as described below may be considered a configuration of a "coarse-grained" intent for the BMS 702/800 that configures the BMS 700/802 to be capable of performing any of the capabilities available from the BMS 702/800 during its initialization, and may be followed by a configuration of a "fine-grained" intent for the BMS 702/800 during a runtime environment of the BMS 702/800 that is based on the workload intent received from the user as described above and that configures the BMS 702/800 to provide particular functionality that satisfies that workload intent using at least some of its available capabilities. However, while a specific example of the configuration of a "coarse-grained" intent for a computing device during its initialization and via the method 900 is provided below, one of skill in the art in possession of the present disclosure will appreciate how the capabilities configuration discussed below may be performed in a variety of situations that will fall within the scope of the present disclosure as well.

The method 900 begins at block 902 where a BIOS begins initialization operations for a computing device. In an embodiment, at block 902, the BMS 800 may be powered on, booted, reset, rebooted, and/or otherwise initialized and, in response, the BIOS provided by the BIOS engine 804 may begin initialization operations for the BMS 800. As will be appreciated by one of skill in the art in possession of the present disclosure, the initialization operations for the BMS 800 may include a SECurity (SEC) phase that handles security for the BMS 800 and sets up a temporary memory environment; a Pre-Extensible Firmware Interface (Pre-EFI) Initialization (PEI) phase that initializes memory in the BMS 800 and prepares Hand-Off Blocks (HOBs) for the next phase; a Driver eXecution Environment (DXE) phase that initializes hardware in the BMS 800 and provides UEFI boot services, runtime services, and DXE services; and a Boot Device Selection (BDS) phase that implements a boot policy for the BMS 800, initializes console devices, loads device drivers, and boots an operating system for the BMS 800 such that the BMS enters a runtime environment.

In a specific example of at block 902*m* the BIOS may perform the SEC phase and the PEI phase of the initialization operations for the BMS 800 discussed above, with blocks 904-912 performed as part of the DXE phase of the initialization operations for the BMS 800 (e.g., following the loading of DXE drivers), followed by the performance of block 914 at the BDS phase of the initialization operations for the BMS 800. However, while a specific timing of the performance of the method 900 with regard to conventional initialization operations for a computing device is described, one of skill in the art in possession of the present disclosure will appreciate how other initialization operation/method performance timings will fall within the scope of the present disclosure as well.

As will be appreciated by one of skill in the art in possession of the present disclosure, the systems and methods of the present disclosure allow the workload intents discussed above to be translated into endpoint operating software provided by the hardware that satisfies the requirements of the corresponding workload for that workload intent. Using the computing device capabilities software environment described below, recursive computing device capabilities software dependencies may be executed to retrieve other computing device capabilities software, allowing the identification of external infrastructure that meets the criteria for satisfying the workload intent while also authenticating that infrastructure and computing devices capabilities software prior to executing it. As such, in addition to the benefits of the secure boot of the system that is available in conventional systems, network connection(s) to endpoints provided by a network boot may also be trusted, ensuring that the workload intent is satisfied while questionable content and/or media are not enabled as part of the network boot.

Figure 10A:
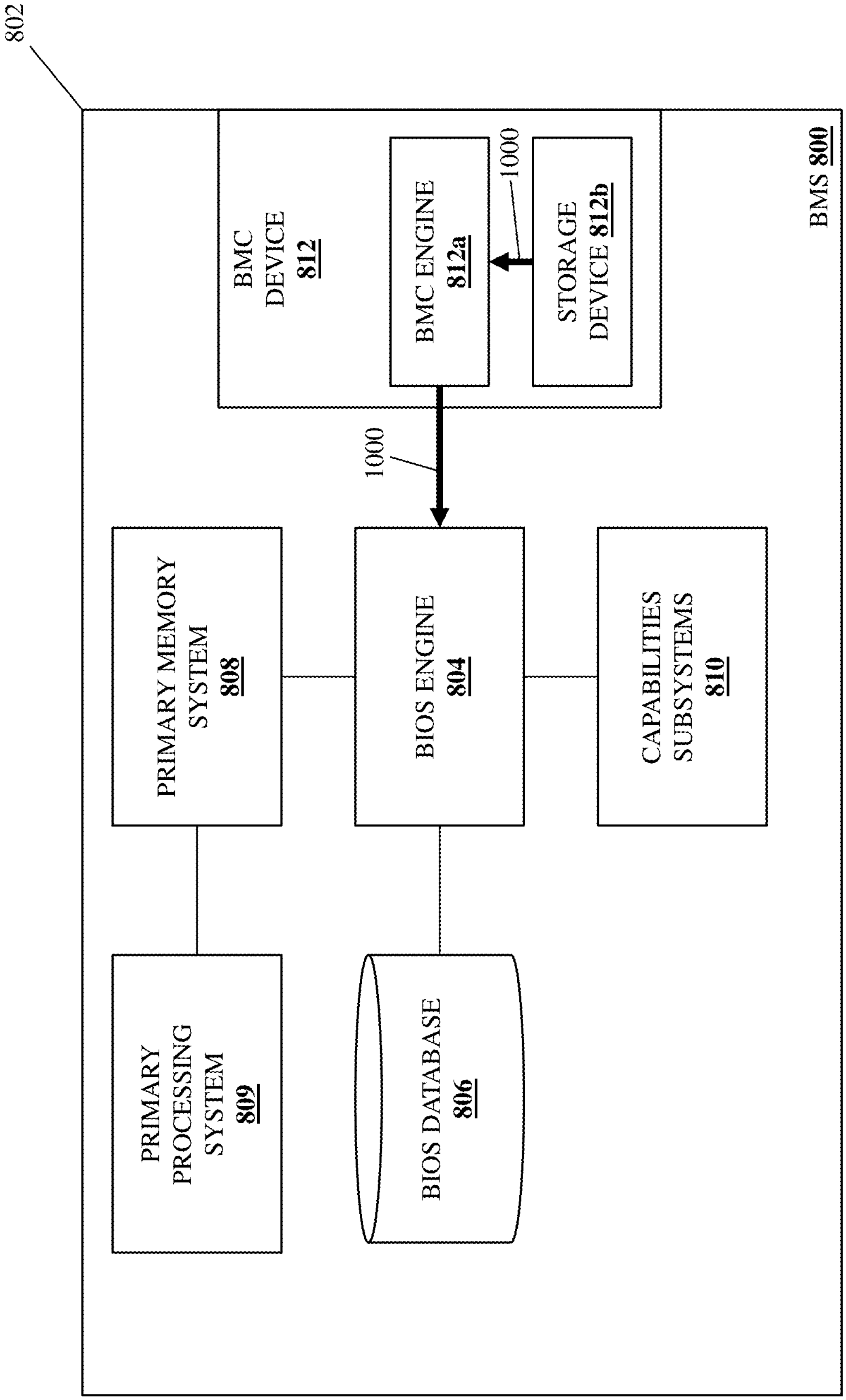
FIG. 10A is a schematic view illustrating an embodiment of the BMS of FIG. 8 operating during the method of FIG. 9.
Figure 10B:
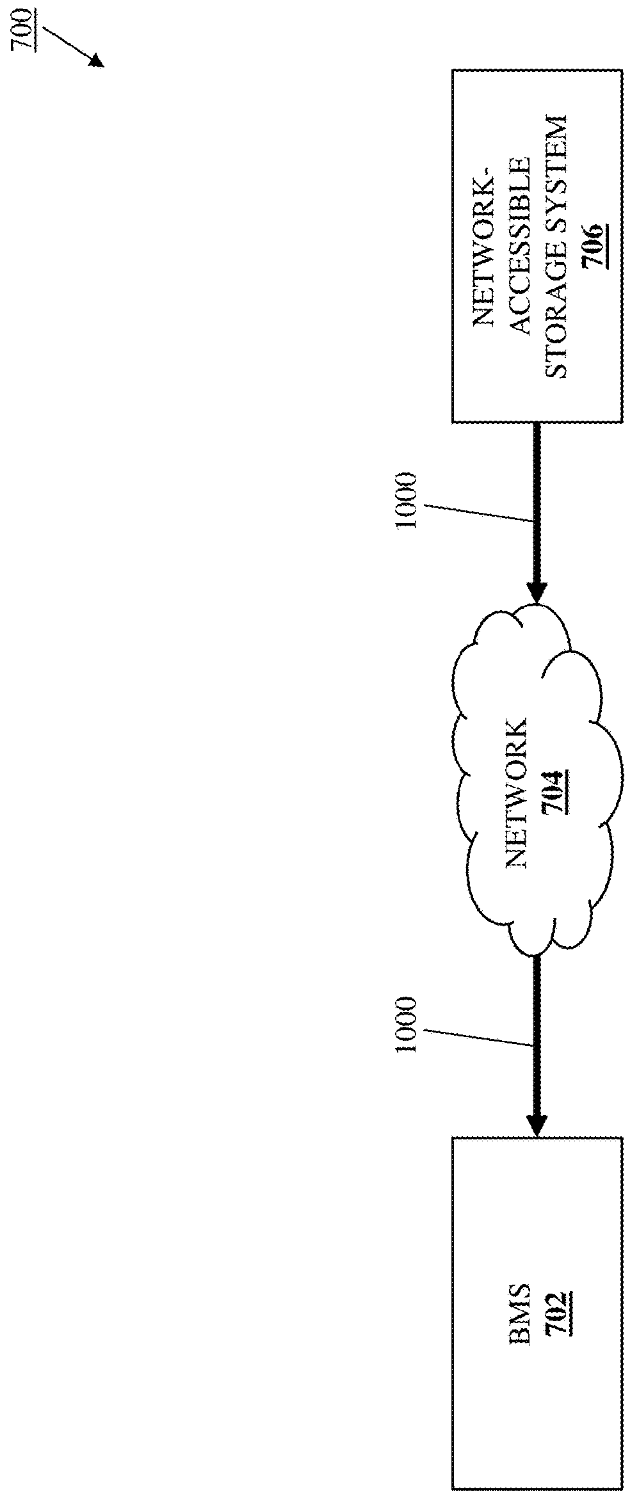
FIG. 10B is a schematic view illustrating an embodiment of the networked system of FIG. 7 operating during the method of FIG. 9.

The method 900 then proceeds to block 904 where the BIOS identifies a plurality of computing device capabilities software. As part of the initialization operations for the BMS 800, the BIOS provided by the BIOS engine 804 and the BMC engine 812*a* in the BMC device 812 may perform a device attach/driver process in order to establish a communications channel with each other. With reference to FIGS. 10A and 10B, in an embodiment of block 904, the BMC engine 812*a* in the BMC device 812 of the BMS 702/800 may then use that communications channel to perform capabilities software identification operations 1000 that may include exposing a plurality of capabilities software, which is available in the storage device 812*b* or via the network 702 in the network-accessible storage system 706, to the BIOS provided by the BIOS engine 804. To provide a specific example, at block 904, the BMC engine 812*a* may activate an Application Programming Interface (API), plugin, or other functionality that exposes a list of capabilities software that is available via the BMC device 812 and that is configured to enable the capabilities of the capabilities subsystems 810 in the BMS 800.

In some embodiments, the storage device 812*b* of the BMC device 812 may be pre-loaded with at least some of the plurality of capabilities software discussed above (e.g., prior the method 900), while in other embodiments, the BMC engine 812*a* in the BMC device 812 of the BMS 702/800 may be configured to retrieve any or all of the plurality of capabilities software described herein via the network 704 and from the network-accessible storage system 706. In some of the examples provided below, any capabilities software that is configured to enable a particular capability of any of the capabilities subsystems 810 may be considered a "payload" for that capability, with each payload accessible to the BIOS provided by the BIOS engine 804 as a standard device (i.e., there is no need for the BIOS to generically support a new driver for a new class of device, as the BMC device 812 may verify the output of its dynamic payload or that an on-disk representation is formatted in a manner that allows mounting, thus lowering the barrier to entry in existing systems). However, while the BIOS provided by the BIOS engine 804 is described as identifying the capabilities software from the BMC device 812, one of skill in the art in possession of the present disclosure will appreciate how the BIOS provided by the BIOS engine 804 may identify the capabilities software at block 904 in any storage device that is accessible to the BIOS (e.g. a storage device included in the BMS 800, a storage device connected directly to the BMX 800, a storage device coupled to the BMS 800 via a network, etc.).

Figure 11:
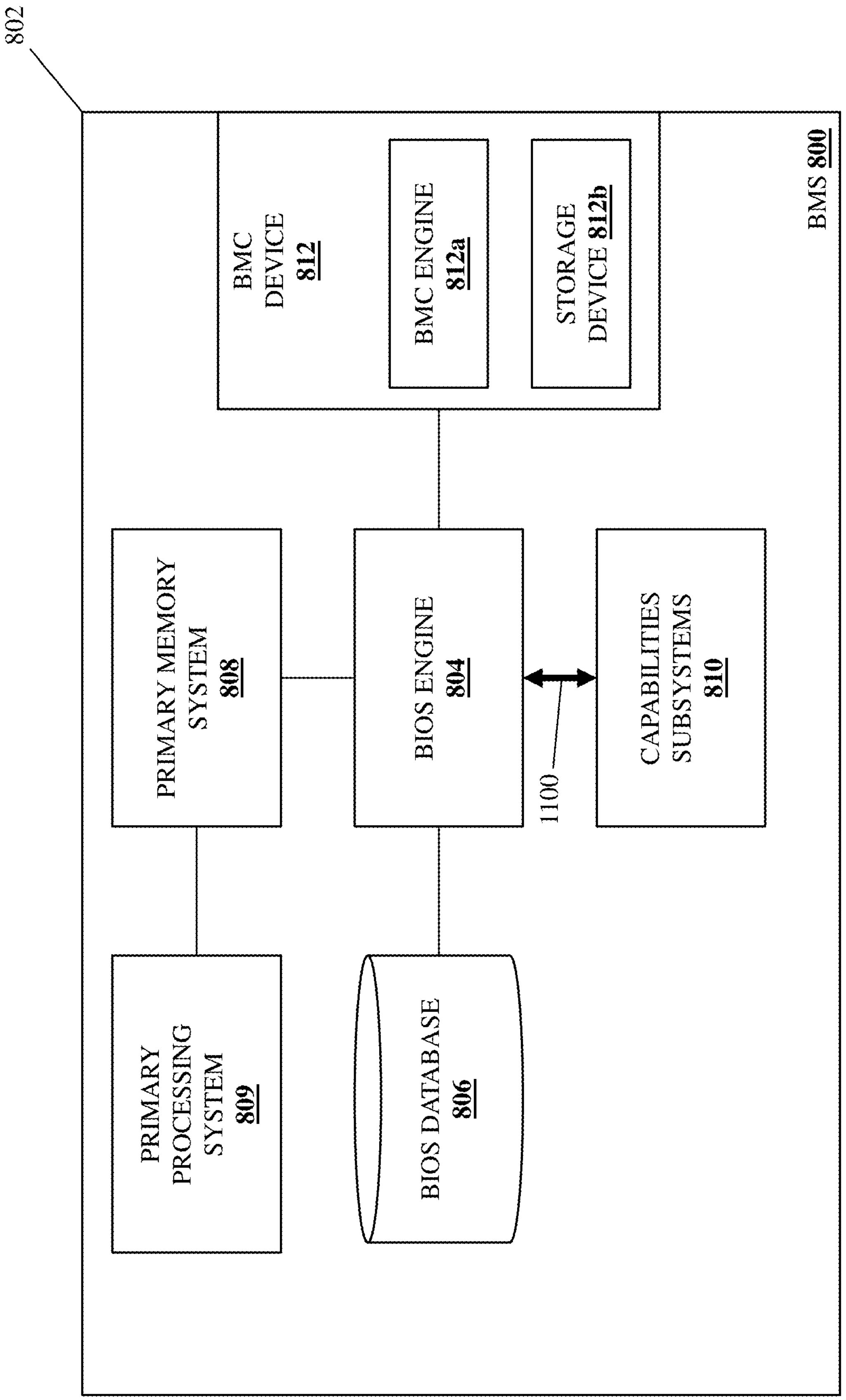
FIG. 11 is a schematic view illustrating an embodiment of the BMS of FIG. 8 operating during the method of FIG. 9.

The method 900 then proceeds to decision block 906 where the method 900 proceeds depending on whether one or more capabilities of capabilities subsystems included in the computing device are discovered. With reference to FIG. 11, in an embodiment of decision block 906, the BIOS provided by the BIOS engine 804 may perform capability discovery operations 1100 that include accessing the capabilities subsystems 810 in the BMS 800 and identifying one or more capabilities of those capabilities subsystem 810. For example, the capability discovery operations 1100 may include identifying hardware in the BMS 800 and determining a capability that is available using that hardware, and while several specific examples are provided below, one of skill in the art in possession of the present disclosure will appreciate how any of a variety of capabilities available using any of a variety of hardware may be discovered at decision block 906 while remaining within the scope of the present disclosure.

If, at decision block 906, one or more capabilities of capabilities subsystems included in the computing device are discovered, the method 900 proceeds to block 908 where the BIOS retrieves a subset of the plurality of computing device capabilities software that enables the capabilities discovered for the capabilities subsystem included in the computing device. In a specific example of decision block 906, the capability discovery operations 1100 may include the BIOS provided by the BIOS engine 804 identifying the primary processing system 809 and the primary memory system 808, and then determining that any of a variety of operating system provisioning capabilities are available using the primary processing system 809 and the primary memory system 808 that enable the BMS 800 to provide operating system functionality such as, for example, microvisor functionality, operating system agent functionality, lifecycle management functionality, and/or other operating system functionality that would be apparent to one of skill in the art in possession of the present disclosure. In another specific example of decision block 906, the capability discovery operations 1100 may include the BIOS provided by the BIOS engine 804 identifying a SmartNIC in the capabilities subsystems 810, and then determining that one or more SmartNIC capabilities are available using the SmartNIC.

In yet another specific example of decision block 906, the capability discovery operations 1100 may include the BIOS provided by the BIOS engine 804 identifying a Trusted Platform Module (TPM), and then determining that one or more security capabilities are available using the TPM. In yet another specific example of decision block 906, the capability discovery operations 1100 may include the BIOS provided by the BIOS engine 804 identifying an accelerator, and then determining that one or more accelerator capabilities are available using the accelerator. In yet another specific example of decision block 906, the capability discovery operations 1100 may Graphics Processing Unit (GPU), and then determining that one or more graphics processing capabilities are available using the GPU. However, while the discovery of several specific capabilities that are available using particular capabilities subsystems 810 have been described, one of skill in the art in possession of the present disclosure will appreciate how any capabilities available via any capabilities subsystems in the BMS 800 will fall within the scope of the present disclosure as well.

Figure 12A:
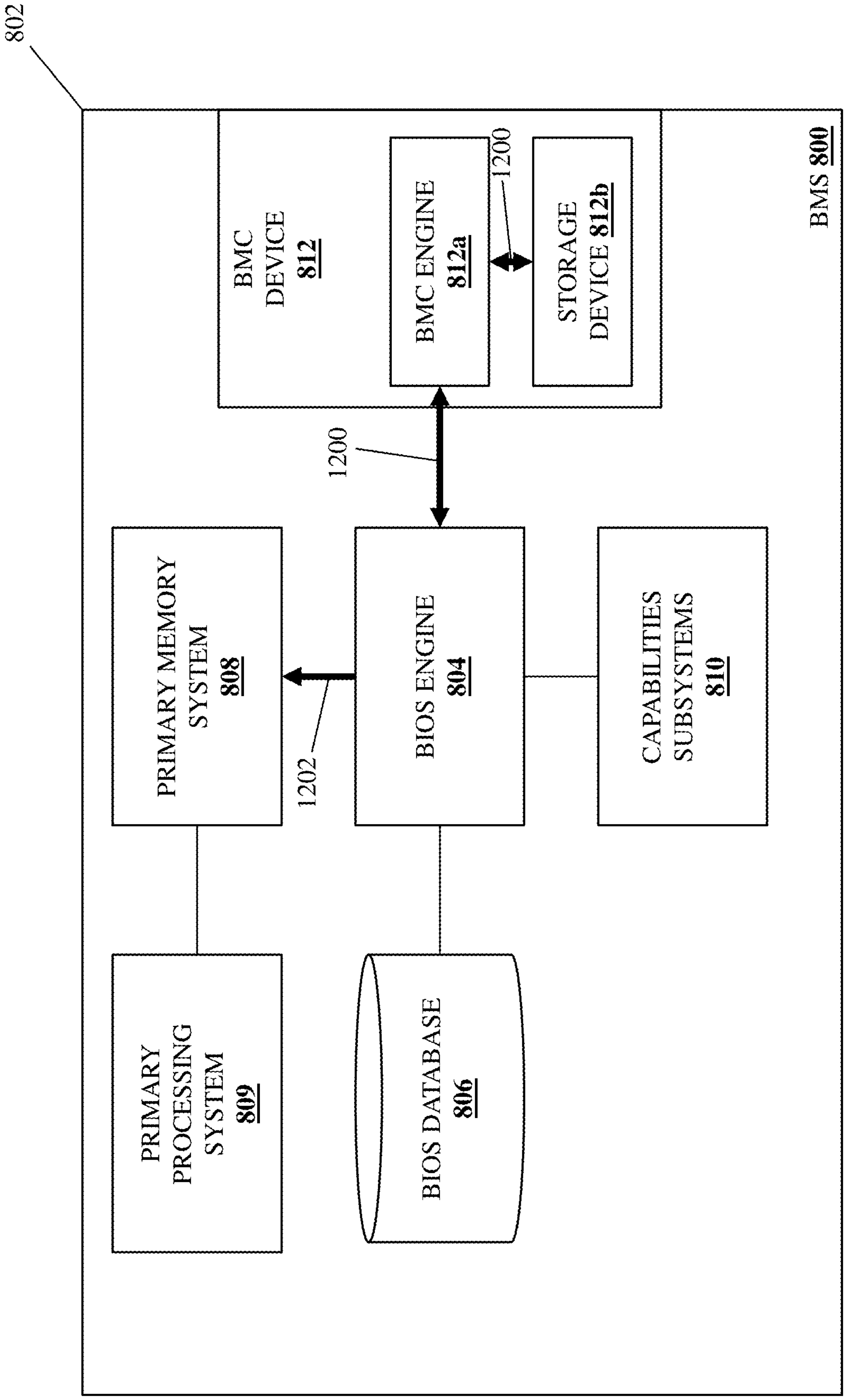
FIG. 12A is a schematic view illustrating an embodiment of the BMS of FIG. 8 operating during the method of FIG. 9.
Figure 12B:
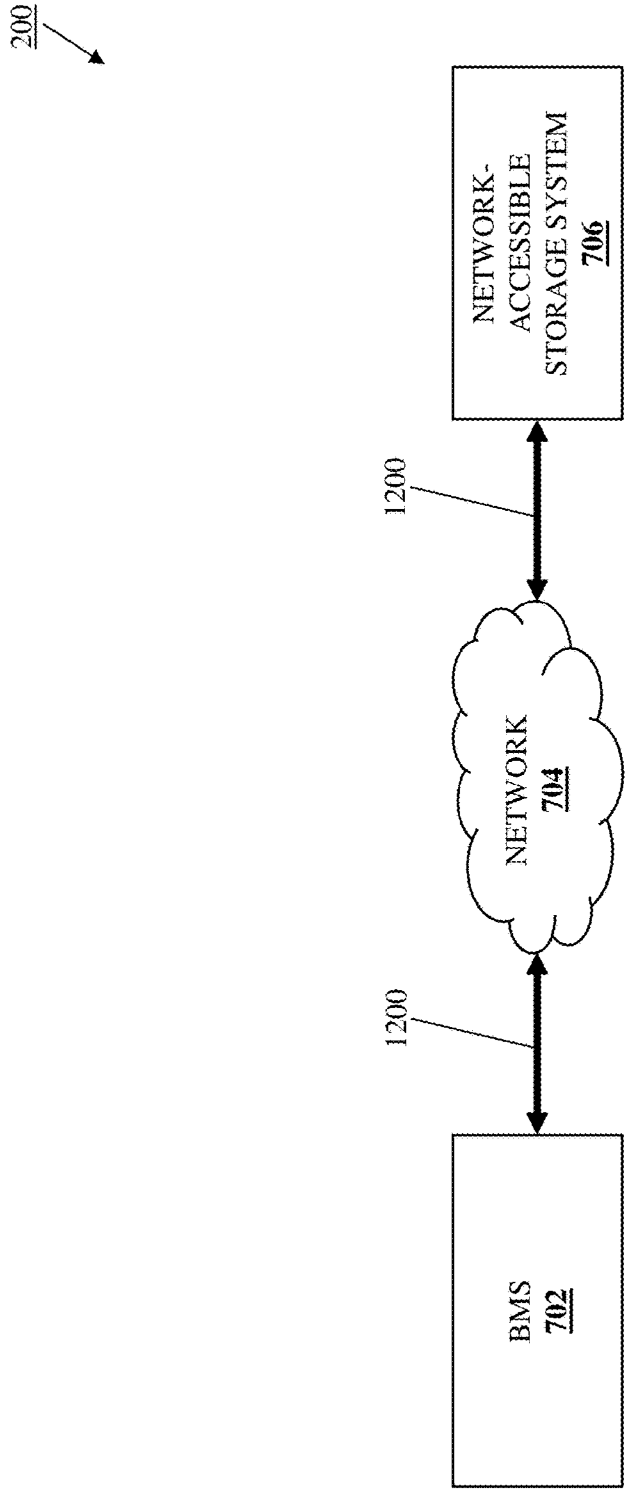
FIG. 12B is a schematic view illustrating an embodiment of the networked system of FIG. 7 operating during the method of FIG. 9.

With reference to FIGS. 12A and 12B, in an embodiment of block 908 and in response to identifying one or more capabilities at decision block 906, the BIOS provided by the BIOS engine 804 and the BMC engine 812*a* in the BMC device 812 may perform capabilities software retrieval operations 1200 to retrieve a subset of the capabilities software that was identified at block 904. For example, the capabilities software retrieval operations 1200 may include the BIOS provided by the BIOS engine 804 providing a capabilities software request to the BMC engine 812*a* in the BMC device 812, with that capabilities software request requesting capabilities software for enabling the capabilities discovered for the capabilities subsystem(s) 810 included in the BMS 702/800 at decision block 906. In response to receiving the capabilities software request, the BMC engine 812*a* in the BMC device 812 may then retrieve the capabilities software requested in the capabilities software request from the storage device 812*b* and/or via the network 702 from the network-accessible storage system 706, and may provide that capabilities software to the BIOS provided by the BIOS engine 804. In response to receiving the capabilities software, the BIOS provided by the BIOS engine 804 may perform capabilities software storage operations 1202 that may include storing that capabilities software in the primary memory system 808.

In a specific example of block 908, the capabilities software retrieval operations 1200 may include the retrieval and storage of capabilities software that is configured to provide operating system functionality (e.g., microvisor software that provides microvisor functionality, operating system agent software (e.g., policy agent software) that provides operating system agent functionality, lifecycle management software that provides lifecycle management functionality, and/or other operating system software that provides other operating system functionality that would be apparent to one of skill in the art in possession of the present disclosure) that is available using the primary processing system 809 and the primary memory system 808. In another specific example of block 908, the capabilities software retrieval operations 1200 may include the retrieval and storage of capabilities software that is configured to enable SmartNIC capabilities using the SmartNIC that is included in the capabilities subsystems 810. In yet another specific example of block 908, the capabilities software retrieval operations 1200 may include the retrieval and storage of capabilities software that is configured to enable security capabilities using the TPM that is included in the capabilities subsystems 810.

In yet another specific example of block 908, the capabilities software retrieval operations 1200 may include the retrieval and storage of capabilities software that is configured to enable accelerator capabilities using the accelerator that is included in the capabilities subsystems 810. In yet another specific example of block 908, the capabilities software retrieval operations 1200 may include the retrieval and storage of capabilities software that is configured to enable graphics processing capabilities using the GPU that is included in the capabilities subsystems 810. However, while the retrieval and storage of specific capabilities software for enabling particular capabilities of particular capabilities subsystems 810 have been described, one of skill in the art in possession of the present disclosure will appreciate how any capabilities software may be retrieved at block 908 while remaining within the scope of the present disclosure as well.

In some embodiments, any capabilities software retrieved at block 908 may be authenticated prior to storing it in the primary memory system 808, subsequent to storing it in a secure portion of the primary memory system 808, and/or using any other authentication techniques that would be apparent to one of skill in the art in possession of the present disclosure. For example, the BIOS provided by the BIOS engine 804 may be configured to perform capabilities software authentication operations that include using a public key of a BMS provider of the BMS 800 to verify that the capabilities software retrieved at block 908 has been signed using a private key of the BMS provider, and/or performing any other authentication operations that would be apparent to one of skill in the art in possession of the present disclosure.

Figure 13:
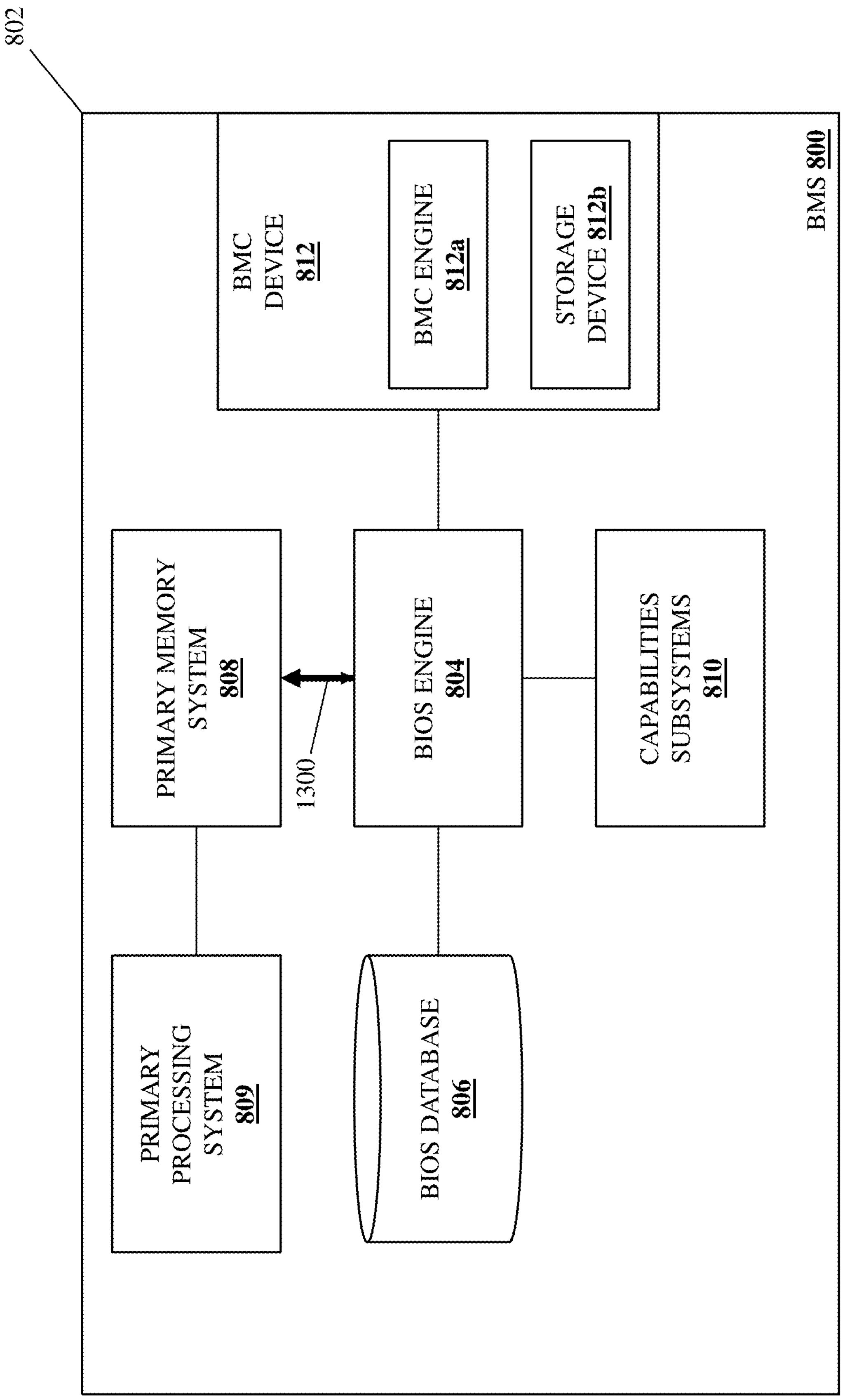
FIG. 13 is a schematic view illustrating an embodiment of the BMS of FIG. 8 operating during the method of FIG. 9.

The method 900 then proceeds to block 910 where the BIOS provides the subset of computing device capabilities software on the computing device. With reference to FIG. 13, in an embodiment of block 910, the BIOS provided by the BIOS engine 804 may perform capabilities software provisioning operations 1300 that may include installing the capabilities software (e.g., execute each of the payloads discussed above) that was retrieved and stored in the primary memory system 808 at block 908. In a specific example of block 910, the capabilities software provisioning operations 1300 may include the installation of capabilities software that is configured to provide operating system functionality such as, for example, microvisor functionality, operating system agent functionality (e.g., policy agent functionality), lifecycle management functionality, and/or other operating system functionality that would be apparent to one of skill in the art in possession of the present disclosure. In another specific example of block 910, the capabilities software provisioning operations 1300 may include the installation of capabilities software that is configured to provide SmartNIC capabilities using the SmartNIC that is included in the capabilities subsystems 810. In yet another specific example of block 910, the capabilities software provisioning operations 1300 may include the installation of capabilities software that is configured to provide security capabilities using the TPM that is included in the capabilities subsystems 810.

In yet another specific example of block 910, the capabilities software provisioning operations 1300 may include the installation of capabilities software that is configured to provide accelerator capabilities using the accelerator that is included in the capabilities subsystems 810. In yet another specific example of block 910, the capabilities software provisioning operations 1300 may include the installation of capabilities software that is configured to provide graphics processing capabilities using the GPU that is included in the capabilities subsystems 810. However, while the provisioning of specific capabilities software for enabling particular capabilities of particular capabilities subsystems 810 have been described, one of skill in the art in possession of the present disclosure will appreciate how any capabilities software may be provided on the BMS 800 at block 910 while remaining within the scope of the present disclosure as well.

The method 900 then returns to decision block 906. As such, the method 900 may loop such that the BIOS provided by the BIOS engine 804 retrieves and provides capabilities software on the BMS 800 to enable any capabilities of the capabilities subsystems 810 that are discovered in the BMS 800. Furthermore, the provisioning of capabilities software on the BMS 800 at block 910 during a current iteration of blocks 906-910 of the method 900 may enable a capability that is then used at decision block 906 in a subsequent iteration of blocks 906-910 to discover one or more additional capabilities of the capabilit(ies) subsystems 810, with capabilities software for those capabilities subsystems 810 retrieved and provided on the BMS 800 at block 910 during that subsequent iteration of blocks 906-910. As such, multiple iterations of the blocks 906-910 of the method 900 may result in the discovery of all of the capabilities of the capabilities subsystems 810 the BMS 800, as well as the retrieval and provisioning of the capabilities software on the BMS 800 in order to configure those capabilities available from those capabilities subsystems 810, until all of the capabilities of the capabilities subsystems in the BMS 800 have been configured.

Furthermore, one of skill in the art in possession of the present disclosure will appreciate how some capabilities may be configured on capabilities subsystems 810 to prevent other capabilities that are available on other capabilities subsystems 810 from being configured. In some embodiments, capabilities software may be provided on the BMS 800 to enable a policy enforcement capability, a security capability, or other capability that may then be used to prevent the configuration of a capability of another capabilit (ies) subsystems 810. For example, a processing capability of the primary processing system 809 may require licensing payments in order to be activated, and a policy enforcement capability may be configured prior to the configuration of that processing capability of the primary processing system 809 and may operate to determine whether the licensing payments have been received and, if so, allow the configuration of that processing capability of the primary processing system 809, while if not, prevent the configuration of that processing capability of the primary processing system 809. However, while a specific example has been provided, one of skill in the art in possession of the present disclosure will appreciate how a capability configured in the BMS 800 may affect the configuration of another capability available in the BMS 800 for a variety of reasons that will fall within the scope of the present disclosure as well.

Figure 14:
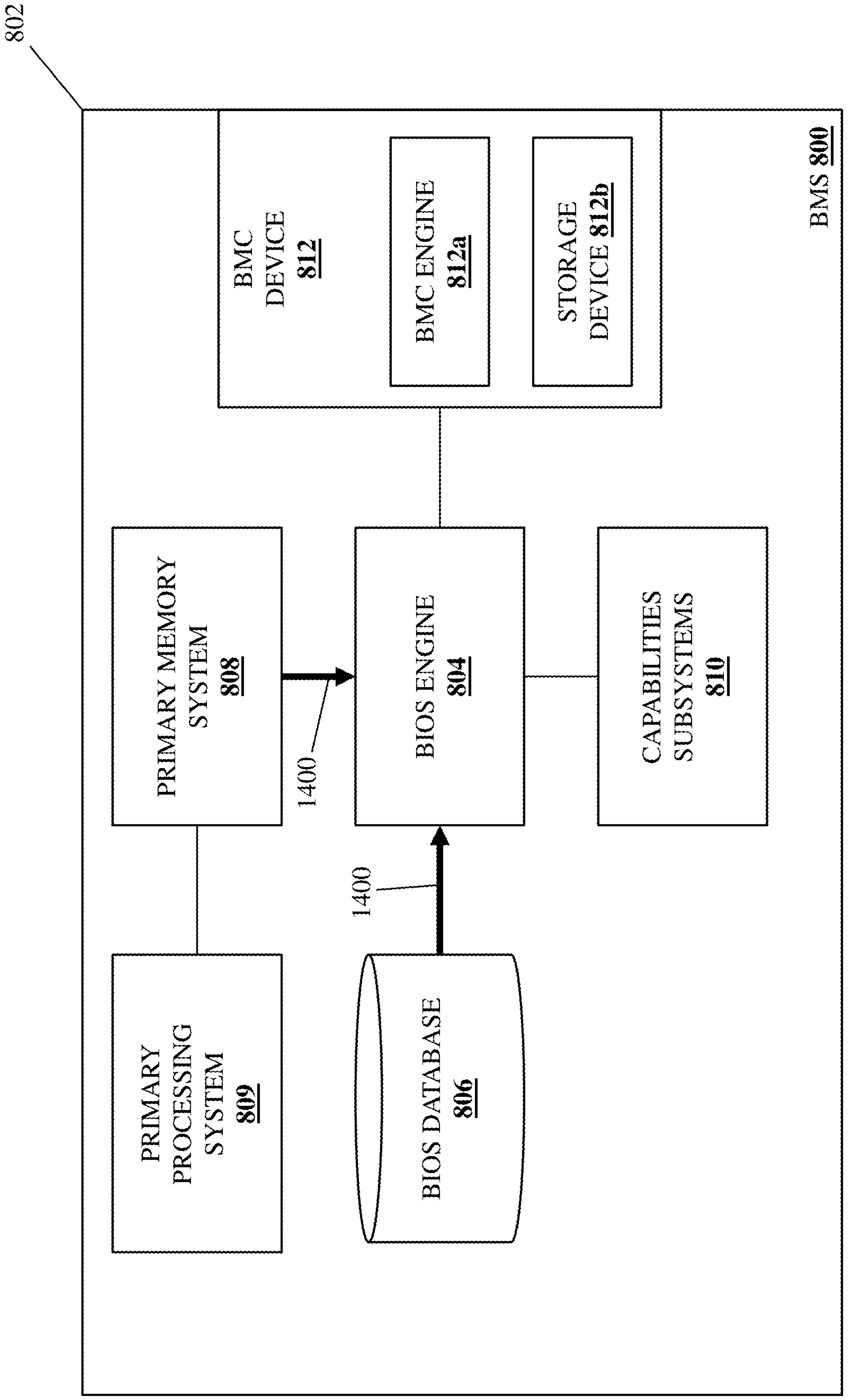
FIG. 14 is a schematic view illustrating an embodiment of the BMS of FIG. 8 operating during the method of FIG. 9.

If, at decision block 906, no capabilities of capabilities subsystems included in the computing device are discovered, the method 900 proceeds to block 912 where the BIOS validates the computing device capabilities software that was provided on the computing device. With reference to FIG. 14, in an embodiment of block 912 and following the provisioning of the capabilities software on the BMS 800 during one or more iterations of blocks 906-910, the BIOS provided by the BIOS engine 804 may perform capabilities software validation operations 1400 that operate to attest to the validity of the capabilities software that was provided on the BMS 800. For example, the capabilities software validation operations 1400 may include the BIOS provided by the BIOS engine 804 generating a "fingerprint" of the capabilities software that was provided on the BMS 800 during the one or more iterations of blocks 906-910 of the method 900 as described above (e.g., generating a hash value by performing a hash operation on the code that was provided on the primary memory system 808 to configure the capabilities software), and comparing that "fingerprint" to a validated "fingerprint" (e.g., a hash value that was previously generated by performing the hash operation on validated code for a combination of capabilities software that is authorized to be provided on the BMS 800) to determine whether the capabilities software that was provided on the primary memory system 808 is valid.

However, while a specific technique has been described for validating capabilities software that has been provided on the BMS 800, one of skill in the art in possession of the present disclosure will appreciate how the capabilities software provided on the BMS 800 may be validated using a variety of techniques that will fall within the scope of the present disclosure as well. Furthermore, one of skill in the art in possession of the present disclosure will appreciate how the authentication of the capabilities software at block 908 combined with the validation of the capabilities software provided on the BMS 800 provides a relatively high level of security for the capabilities software configured on the BMS 800.

Figure 15:
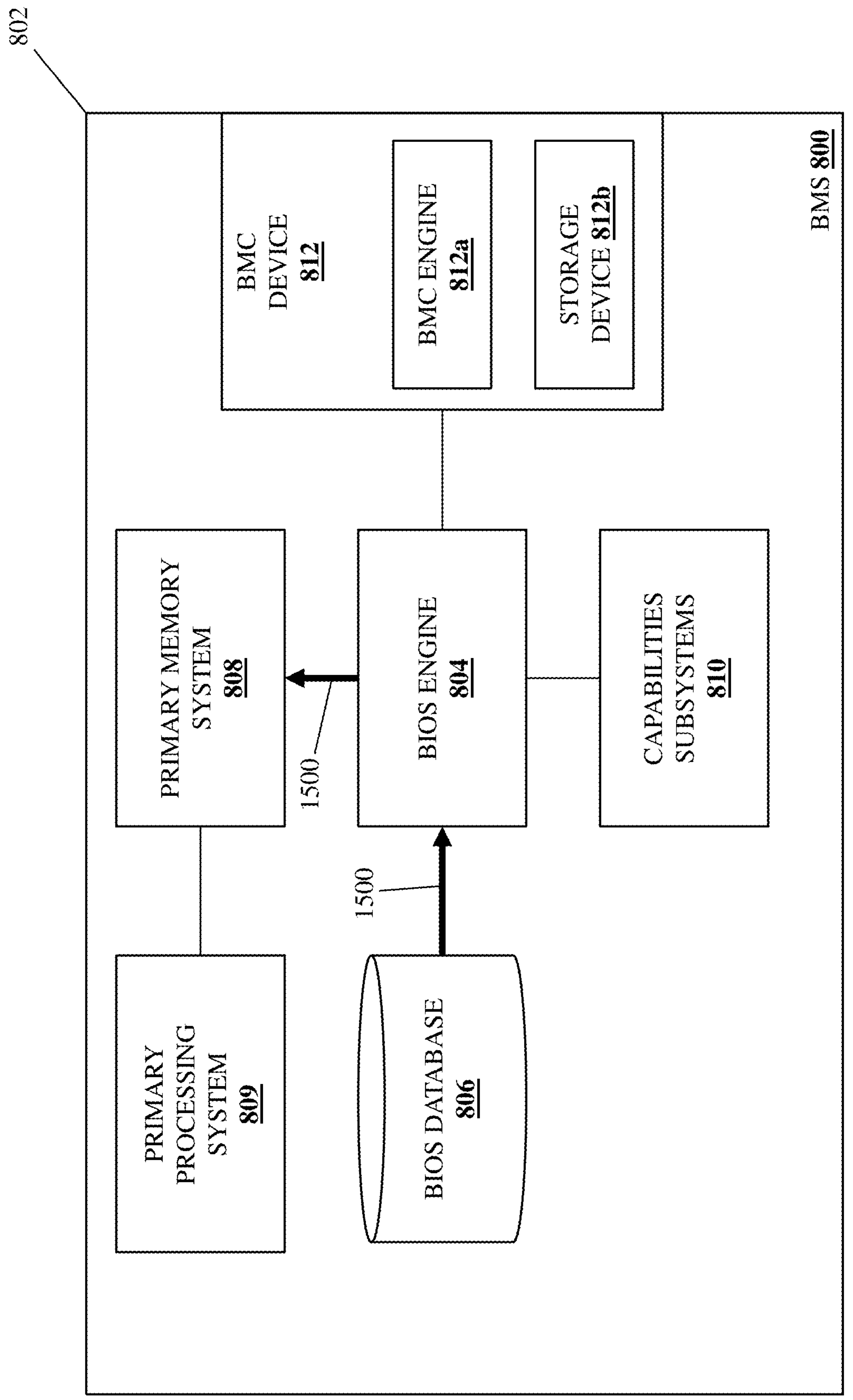
FIG. 15 is a schematic view illustrating an embodiment of the BMS of FIG. 8 operating during the method of FIG. 9.

The method 900 then proceeds to block 914 where the BIOS provides an operating system on the computing device to complete the initialization operations for the computing device and enter a runtime environment for the computing device. With reference to FIG. 15, in an embodiment of block 914 and following the provisioning and validation of the capabilities software on the BMS 800, the BIOS provided by the BIOS engine 804 may perform operating system provisioning operations 1500 that include retrieving operating system code from the BIOS database 806 and executing that operating system code on the primary memory system 808 to provide an operating system on the BMS 800, which one of skill in the art in possession of the present disclosure will appreciate operates to complete the initialization operations for the BMS 800 such that the BMS 800 enters a runtime environment. As will be appreciated by one of skill in the art in possession of the present disclosure, the operating system provided on the BMS 800 may utilize any of the enhanced operating system functionality (e.g., the microvisor functionality, operating system agent functionality (e.g., policy agent functionality), lifecycle management functionality, and/or other operating system functionality discussed above) provided via the capabilities software configuration described above.

In specific embodiments, following block 914, the workload intents received by users as discussed above may be satisfied using the BMS 800 similarly as described above, and one of skill in the art in possession of the present disclosure will appreciate how the capabilities configuration for the BMS 800 described above will enable a variety of workload intents to be satisfied using the BMS 800. For example, testing capabilities may be available in the BMS 800, and the capability configurations for the BMS 800 as part of the method 900 may include the provisioning of capabilities software that enables those testing capabilities once the operating system has been provided on the BMS 800. Subsequently and during a runtime environment of the BMS 800, the workload intent may be received from a user that requests particular testing functionality, and may result in the BMS 800 being configured to perform that particular testing functionality using the testing capabilities that were enabled as part of the method 900. However, while a specific example has been provided, one of skill in the art in possession of the present disclosure will appreciate how the capability configuration as part of the method 900 may allow for a variety of workload intents to be satisfied while remaining within the scope of the present disclosure as well.

Thus, systems and methods have been described that provide for the configuration of the capabilities of a computing device by a BIOS and during initialization of the computing device prior to the provisioning of an operating system on the computing device. For example, the BIOS-initialization-based capabilities configuration system of the present disclosure may include a computing device having a BIOS coupled to a plurality of capabilities subsystems. The BIOS begins initialization operations for the computing device, identifies a plurality of computing device capabilities software, and discovers capabilities of the plurality of capabilities subsystems. Based on the capabilities discovered for the plurality of computing device capabilities subsystems, the BIOS retrieves a subset of the plurality of computing device capabilities software, provides the subset of the plurality of computing device capabilities software on the computing device, and validates the subset of the plurality of computing device capabilities software provided on the computing device. Subsequent to validating the subset of the plurality of computing device capabilities software provided on the computing device, the BIOS provides an operating system on the computing device to complete the initialization operations for the computing device and enter a runtime environment for the computing device. As such, secure capabilities configuration is provided for a computing device during its initialization to enable relatively more complex operating system capabilities, networking capabilities, security capabilities, accelerator capabilities, graphics processing capabilities, and/or other capabilities prior to the provisioning of an operating system on that computing device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Basic Input/Output System (BIOS)-initialization-based capabilities configuration system, comprising:
- a computing device;
- a plurality of capabilities subsystems that are included in the computing device; and
- a Basic Input/Output System (BIOS) that is included in the computing device, that is coupled to the plurality of capabilities subsystems, and that is configured to:
  - begin initialization operations for the computing device;
  - identify a plurality of computing device capabilities software;
  - discover first capabilities of the plurality of capabilities subsystems;
  - retrieve, based on the first capabilities discovered for the plurality of computing device capabilities subsystems, a first subset of the plurality of computing device capabilities software;
  - provide the first subset of the plurality of computing device capabilities software on the computing device;
  - validate the first subset of the plurality of computing device capabilities software provided on the computing device; and
  - provide, subsequent to validating the first subset of the plurality of computing device capabilities software provided on the computing device, an operating system on the computing device to complete the initialization operations for the computing device and enter a runtime environment for the computing device.

2. The system of claim 1, further comprising:
- a Baseboard Management Controller (BMC) device that is included in the computing device and that is configured to identify the plurality of computing device capabilities software to the BIOS.

3. The system of claim 1, wherein the BIOS is configured to:
- discover, in response to providing the first subset of the plurality of computing device capabilities software on the computing device, second capabilities of the plurality of computing device capabilities subsystems;
- retrieve, based on the second capabilities discovered for the plurality of capabilities subsystems, a second subset of the plurality of computing device capabilities software;
- provide the second subset of the plurality of computing device capabilities software on the computing device;
- validate the first subset and the second subset of the plurality of computing device capabilities software provided on the computing device; and
- provide, subsequent to validating the first subset and the second subset of the plurality of computing device capabilities software provided on the computing device, the operating system to complete the initialization operations for the computing device and enter the runtime environment for the computing device.

4. The system of claim 1, wherein the BIOS retrieves the first subset of the plurality of computing device capabilities software from a storage subsystem that is included in the computing device.

5. The system of claim 1, wherein the BIOS retrieves the first subset of the plurality of computing device capabilities software from a storage subsystem that is coupled to the computing device via a network.

6. The system of claim 1, wherein the BIOS is configured to:

retrieve, based on the first capabilities discovered for the plurality of computing device capabilities subsystems, operating system software; and provide, using the operating system software, the operating system on the computing device.

7. An Information Handling System (IHS), comprising:

a Basic Input/Output System (BIOS) processing system; and a BIOS memory system that is coupled to the BIOS processing system and that includes instructions that, when executed by the BIOS processing system, cause the BIOS processing system to provide a BIOS engine that is configured to:

begin initialization operations for the IHS;

identify a plurality of capabilities software;

discover first capabilities of a plurality of capabilities subsystems that are coupled to the BIOS processing system;

retrieve, based on the first capabilities discovered for the plurality of capabilities subsystems, a first subset of the plurality of capabilities software;

provide the first subset of the plurality of capabilities software on the IHS;

validate the first subset of the plurality of capabilities software provided on the IHS; and provide, subsequent to validating the first subset of the plurality of computing device capabilities software provided on the IHS, an operating system on the IHS to complete the initialization operations for the IHS and enter a runtime environment for the IHS.

8. The IHS of claim 7, wherein the BIOS engine is configured to identify the plurality of capabilities software from a Baseboard Management Controller (BMC) device that is coupled to the BIOS processing system.

9. The IHS of claim 7, wherein the BIOS engine is configured to:

discover, in response to providing the first subset of the plurality of capabilities software on the IHS, second capabilities of the plurality of capabilities subsystems;

retrieve, based on the second capabilities discovered for the plurality of capabilities subsystems, a second subset of the plurality of capabilities software;

provide the second subset of the plurality of capabilities software on the IHS;

validate the first subset and the second subset of the plurality of capabilities software provided on the IHS; and provide, subsequent to validating the first subset and the second subset of the plurality of capabilities software provided on the IHS, the operating system to complete the initialization operations for the IHS and enter the runtime environment for the IHS.

10. The IHS of claim 7, wherein the BIOS engine retrieves the first subset of the plurality of capabilities software from a storage subsystem that is included in the IHS.

11. The IHS of claim 7, wherein the BIOS engine retrieves the first subset of the plurality of capabilities software from a storage subsystem that is coupled to the IHS via a network.

12. The IHS of claim 7, wherein the BIOS engine is configured to:

retrieve, based on the first capabilities discovered for the plurality of capabilities subsystems, operating system software; and provide, using the operating system software, the operating system on the computing device.

13. The IHS of claim 7, wherein the first subset of plurality of capabilities software includes at least one of:

policy agent software that is configured to provide a policy agent on the IHS; and lifecycle manager software that is configured to provide a lifecycle manager on the IHS.

14. A method for configuring capabilities of a computing device by a Basic Input/Output System (BIOS) during initialization, comprising:

beginning, by a Basic Input/Output System (BIOS), initialization operations for a computing device;

identifying, by the BIOS, a plurality of computing device capabilities software;

discovering, by the BIOS, first capabilities of a plurality of capabilities subsystems included in the computing device;

retrieving, by the BIOS based on the first capabilities discovered for the plurality of computing device capabilities subsystems, a first subset of the plurality of computing device capabilities software;

providing, by the BIOS, the first subset of the plurality of computing device capabilities software on the computing device;

validating, by the BIOS, the first subset of the plurality of computing device capabilities software provided on the computing device; and providing, by the BIOS subsequent to validating the first subset of the plurality of computing device capabilities software provided on the computing device, an operating system on the computing device to complete the initialization operations for the computing device and enter a runtime environment for the computing device.

15. The method of claim 14, further comprising:

identifying, by a Baseboard Management Controller (BMC) device that is included in the computing device, the plurality of computing device capabilities software to the BIOS.

16. The method of claim 14, further comprising:

discovering, by the BIOS in response to providing the first subset of the plurality of computing device capabilities software on the computing device, second capabilities of the plurality of computing device capabilities subsystems;

retrieving, by the BIOS based on the second capabilities discovered for the plurality of capabilities subsystems, a second subset of the plurality of computing device capabilities software;

providing, by the BIOS, the second subset of the plurality of computing device capabilities software on the computing device;

validating, by the BIOS, the first subset and the second subset of the plurality of computing device capabilities software provided on the computing device; and providing, by the BIOS subsequent to validating the first subset and the second subset of the plurality of computing device capabilities software provided on the computing device, the operating system to complete the initialization operations for the computing device and enter the runtime environment for the computing device.

17. The method of claim 14, further comprising:

retrieving, by the BIOS, the first subset of the plurality of computing device capabilities software from a storage subsystem that is included in the computing device.

18. The method of claim 14, further comprising:
retrieving, by the BIOS, the first subset of the plurality of computing device capabilities software from a storage subsystem that is coupled to the computing device via a network.

19. The method of claim 14, further comprising:
retrieving, by the BIOS based on the first capabilities discovered for the plurality of computing device capabilities subsystems, operating system software; and
providing, by the BIOS using the operating system software, the operating system on the computing device.

20. The method of claim 14, wherein the first subset of plurality of capabilities software includes at least one of:
policy agent software that is configured to provide a policy agent on the computing device; and
lifecycle manager software that is configured to provide a lifecycle manager on the computing device.

* * * * *